(12) United States Patent
Matsushima

(10) Patent No.: US 9,361,315 B2
(45) Date of Patent: Jun. 7, 2016

(54) IMAGE DISPLAY APPARATUS, IMAGE DISPLAY SYSTEM, AND IMAGE DISPLAY METHOD

(71) Applicant: Hiroyuki Matsushima, Kanagawa (JP)

(72) Inventor: Hiroyuki Matsushima, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/350,105

(22) PCT Filed: Oct. 29, 2012

(86) PCT No.: PCT/JP2012/078550
§ 371 (c)(1),
(2) Date: Apr. 7, 2014

(87) PCT Pub. No.: WO2013/065858
PCT Pub. Date: May 10, 2013

(65) Prior Publication Data
US 2014/0289817 A1    Sep. 25, 2014

(30) Foreign Application Priority Data

Nov. 4, 2011 (JP) .................................. 2011-242718
Oct. 11, 2012 (JP) .................................. 2012-226000

(51) Int. Cl.
*G06F 17/30* (2006.01)
*H04L 29/06* (2006.01)
*G06F 3/14* (2006.01)

(52) U.S. Cl.
CPC ........ *G06F 17/30244* (2013.01); *G06F 3/1454* (2013.01); *H04L 63/08* (2013.01); *G09G 2330/022* (2013.01); *G09G 2358/00* (2013.01); *G09G 2370/025* (2013.01)

(58) Field of Classification Search
CPC ....... H04L 63/10; H04L 63/08; H04L 63/083; H04W 12/08; H04W 12/06
See application file for complete search history.

(56) References Cited

U.S. PATENT DOCUMENTS 6,735,616 B1 * 5/2004 Thompson ............ H04L 67/025
360/79
7,263,612 B2 * 8/2007 Yamazaki ........... H04L 12/1822
709/225

(Continued)

FOREIGN PATENT DOCUMENTS

JP    2004-318746    11/2004
JP    2008-011429    1/2008

(Continued)

OTHER PUBLICATIONS

International Search Report Issued on Feb. 5, 2013 in PCT/JP2012/078550 filed on Oct. 29, 2012.

*Primary Examiner* — Yonas Bayou
(74) *Attorney, Agent, or Firm* — IPUSA, PLLC

(57) ABSTRACT

An image display apparatus includes a location information generating unit that generates location information of index information stored in the server apparatus and location information of image data stored in the server apparatus; an index obtaining unit that obtains the index information from the server apparatus using the location information of the index information; a list screen generating unit that generates a list screen including information on the image data stored in the server apparatus using the index information and displays the list screen on a display unit; an image data obtaining unit that obtains the image data from the server apparatus using the location information of the image data that is selected by an operator from the list screen; and a display screen generating unit that generates a display screen of the obtained image data and displays the display screen on the display unit.

14 Claims, 34 Drawing Sheets

(56) References Cited

U.S. PATENT DOCUMENTS

| | | | |
|---|---|---|---|
| 7,950,046 B2 * | 5/2011 | Kropivny | H04L 63/104 726/3 |
| 8,060,887 B2 * | 11/2011 | Kropivny | H04L 67/38 709/204 |
| 8,346,824 B1 * | 1/2013 | Lyle | G06F 17/30206 707/822 |
| 8,417,679 B1 * | 4/2013 | Lyle | G06F 17/30091 707/696 |
| 8,775,373 B1 * | 7/2014 | Ross | H04L 67/1095 707/612 |
| 2003/0142352 A1 | 7/2003 | Matsunaga et al. | |
| 2005/0033957 A1 * | 2/2005 | Enokida | H04L 63/0442 713/156 |
| 2005/0216557 A1 * | 9/2005 | Ohwa | G06Q 10/109 709/204 |
| 2009/0037433 A1 * | 2/2009 | Nakamura | H04L 67/06 |
| 2010/0122162 A1 | 5/2010 | Terada et al. | |
| 2010/0224761 A1 * | 9/2010 | Daio | G01V 8/20 250/208.2 |
| 2012/0066736 A1 * | 3/2012 | Labrador | H04L 63/08 726/1 |
| 2012/0278408 A1 * | 11/2012 | Seferian | G06Q 10/1095 709/206 |

FOREIGN PATENT DOCUMENTS

| | | |
|---|---|---|
| JP | 2008-310247 | 12/2008 |
| JP | 2010-102412 | 5/2010 |
| JP | 2011-059675 | 3/2011 |
| WO | WO 2008/156046 A1 | 12/2008 |

* cited by examiner

FIG.5

NETWORK APPLICATION SETTINGS

REGISTER OR CHECK PROJECTION SERVER SETTINGS INFORMATION.

PROJECTION SERVER

PJLink

PROJECTION SERVER VALIDITY SETTING  VALID  INVALID

REMOTE

ROOT URL  http://192.168.1.10/

STATUS

INDEX FILE

SECURITY

ACCESS RESTRICTION TYPE  NONE  ACCESS NUMBER

FIG.6

| SETTING | VALUE |
|---|---|
| ROOT URL | "http://192.168.1.10:8080/pjserv/" |
| INDEX FILE | "index.json" |

FIG.7

| | |
|---|---|
| ■ /pjserv/ | ROOT |
|   ■ index.json | ROOT INDEX |
|   ■ subdir/ | SUBDIRECTORY |
|     ■ index.json | SUBDIRECTORY INDEX |
|     ■ slide001.jpg | IMAGE FILE |
|     ■ slide002.jpg | IMAGE FILE |
|   ■ file01.jpg | IMAGE FILE |
|   ■ file02.jpg | IMAGE FILE |

FIG.8

```
[
  {
    "type": "directory",
    "name": "subdir"
  },
  {
    "type": "file",
    "name": "file01.jpg"
  },
  {
    "type": "file",
    "name": "file02.jpg"
  }
]
```

FIG.9

```
[
  {
    "type": "file",
    "name": "slide001.jpg"
  },
  {
    "type": "file",
    "name": "slide002.jpg"
  }
]
```

FIG.10

| SETTING | VALUE |
|---|---|
| ROOT URL | "https://www.example.com/pjserv/{n}/ |
| INDEX FILE | "" |

FIG.12

```
[
 {
   "type": "directory",
   "name": "ppt1"
 },
 {
   "type": "directory",
   "name": "ppt2"
 }
]
```

FIG.13

```
[
 {
   "type": "file",
   "name": "slide001.jpg"
 },
 {
   "type": "file",
   "name": "slide002.jpg"
 }
]
```

FIG.17A

- ACCESS NUMBER INVALID
- CURRENT HIERARCHY = "/"
- URL = ROOT URL + CURRENT HIERARCHY + INDEX FILE NAME
  - EXAMPLE:FIG.6 SETTINGS
  - URL = "http://192.168.1.10:8080/pjserv/" + "/" + "index.json"
    = "http://192.168.1.10:8080/pjserv/index.json"

FIG.17B

- ACCESS NUMBER VALID
- CURRENT HIERARCHY = "/"
- URL = ROOT URL←ACCESS NUMBER EMBEDDED + CURRENT HIERARCHY + INDEX FILE NAME
  - EXAMPLE:FIG.10 SETTINGS AND ACCESS NUMBER 123456 IS INPUT
  - URL = ("https://www.example.com/pjserv/{n}/"←{n}="123456") + "/" + ""
    = "https://www.example.com/pjserv/123456/"

FIG.18A

- SUBDIRECTORY SELECTED
- CURRENT HIERARCHY = CURRENT HIERARCHY + SUBDIRECTORY NAME
  - EXAMPLE:SELECT "subdir" FROM ROOT AT SERVER WITH FIG.7 CONFIGURATION
  - CURRENT HIERARCHY = "/subdir/"
- URL = ROOT URL + CURRENT HIERARCHY + INDEX FILE NAME
  - URL = "http://192.168.1.10:8080/pjserv/" + "/subdir/" + "index.json"
    = "http://192.168.1.10:8080/pjserv/subdir/index.json"

FIG.18B

- "HIGHER HIERARCHY" SELECTED
- CURRENT HIERARCHY IS ROOT ("/"):NO ACTION
- CURRENT HIERARCHY IS SUBDIRECTORY:CURRENT HIERARCHY = 1 LEVEL HIGHER
  - EXAMPLE:SELECT "HIGHER HIERARCHY" WHEN "subdir" OF FIG.7 IS DISPLAYED
    (CURRENT HIERARCHY = "/subdir/")
  - CURRENT HIERARCHY = "/"
- URL = ROOT URL + CURRENT HIERARCHY + INDEX FILE NAME
  - URL = "https://192.168.1.10:8080/pjserv/") + "/" + "index.json"
    = "https://192.168.1.10:8080/pjserv/index.json"

FIG.19

- FILE SELECTED
  - URL = ROOT URL + CURRENT HIERARCHY + FILE NAME
  - EXAMPLE: SELECT "slide001.jpg" WHEN "subdir" OF FIG.7 IS DISPLAYED
    (CURRENT HIERARCHY = "/subdir/")

- URL = "http://192.168.1.10:8080/pjserv/" + "/subdir/" + "slide001.jpg"
        = "http://192.168.1.10:8080/pjserv/subdir/slide001.jpg"

FIG.30

```
PUT /pjserv/config HTTP/1.1
Host: 192.168.1.100
Content-Type: application/json
Authorization: Basic YWRtaW46cGFzc3dvcmQ=

{
    "root_url": "http://192.168.1.10:8080/pjserv/",
    "index_name": "index.json"
    "access_control": "none"
}
```

FIG.32

| SETTING | VALUE |
|---|---|
| ROOT URL | "http://192.168.1.10:8080/pjserv/" |
| INDEX FILE | "index.json" |
| TITLE | "COMPANY PJ PORTAL" |
| DIRECTORY | "/subdir/" |

IMAGE DISPLAY APPARATUS, IMAGE DISPLAY SYSTEM, AND IMAGE DISPLAY METHOD

TECHNICAL FIELD

The present invention relates to an image display apparatus, an image display system, and an image display method.

BACKGROUND ART

It is becoming conventional practice at corporate meetings and other gatherings to connect a PC to a projector to project an image during the meeting. Also, a projector may access a projectable file stored in a USB memory loaded therein to project the accessed file (e.g., see Japanese Laid-Open Patent Publication No. 2008-310247).

However, to project an image using a conventional projector, a PC storing the image has to be connected to the projector or a USB memory storing the image has to be loaded in the projector. In the case of carrying a projector to a remote location to perform the image projection, the PC or the USB memory storing the image to be projected must carried along with the projector thereby creating an inconvenience. Also, in the case where a PC or a USB memory storing the image has to be carried along with the projector, the PC or the USB memory may be lost or stolen so that there is a risk of confidential information leakage.

DISCLOSURE OF THE INVENTION

Problems to be Solved by the Invention

It is a general object of at least one embodiment of the present invention to provide an image display apparatus that substantially obviates one or more problems caused by the limitations and disadvantages of the related art.

One object of at least one embodiment of the present invention is to improve convenience and prevent confidential information leakage in an image display apparatus, an image display system, and an image display method.

Means for Solving the Problems

In one embodiment of the present invention, an image display apparatus is connected to a server apparatus via a network and includes a location information generating unit that generates at least one of location information of index information stored in the server apparatus and location information of image data stored in the server apparatus; an index obtaining unit that obtains the index information from the server apparatus using the location information of the index information; a list screen generating unit that generates a list screen including information on the image data stored in the server apparatus using the index information and prompts a display unit to display the list screen; an image data obtaining unit that obtains the image data from the server apparatus using the location information of the image data that is selected by an operator from the list screen; and a display screen generating unit that generates a display screen of the obtained image data and prompts the display unit to display the display screen.

In other embodiments, one or more features of the image display apparatus according to the above embodiment may be applied to an image display system, an image display method, a computer program or a data structure for enabling a computer to execute the image display method, or a recording medium storing the computer program or the data structure, for example.

Effects of the Present Invention

According to an aspect of the present invention, convenience may be improved and confidential information leakage may be prevented in an image display apparatus, an image display system, and an image display method.

BRIEF DESCRIPTION OF THE DRAWINGS

FIG. 5 shows an example of a setting screen;

FIG. 6 shows exemplary setting values designated for a root URL setting and an index file setting;

FIG. 7 shows an exemplary configuration of a URL path of a web server;

FIG. 8 shows an exemplary configuration of an index file of a root directory;

FIG. 9 shows an exemplary configuration of an index file of a subdirectory;

FIG. 10 shows another exemplary set of setting values designated for the root URL setting and the index file setting;

FIG. 12 shows an exemplary configuration of an index file of subdirectory "123456/";

FIG. 13 shows an exemplary configuration of an index file of subdirectory "999999/ppt99/";

FIGS. 17A and 17B illustrate exemplary ways of generating a URL in step S12 of FIG. 16;

FIGS. 18A and 18B illustrate exemplary ways of generating a URL in step S20 of FIG. 16;

FIG. 19 illustrates an exemplary way of generating a URL for obtaining a content file in step S22 of FIG. 16;

FIG. 30 shows an exemplary web API having authentication information for basic authentication added to the web API shown in FIG. 20;

FIG. 32 shows an exemplary configuration of server setting information of the web server;

Figure 1:
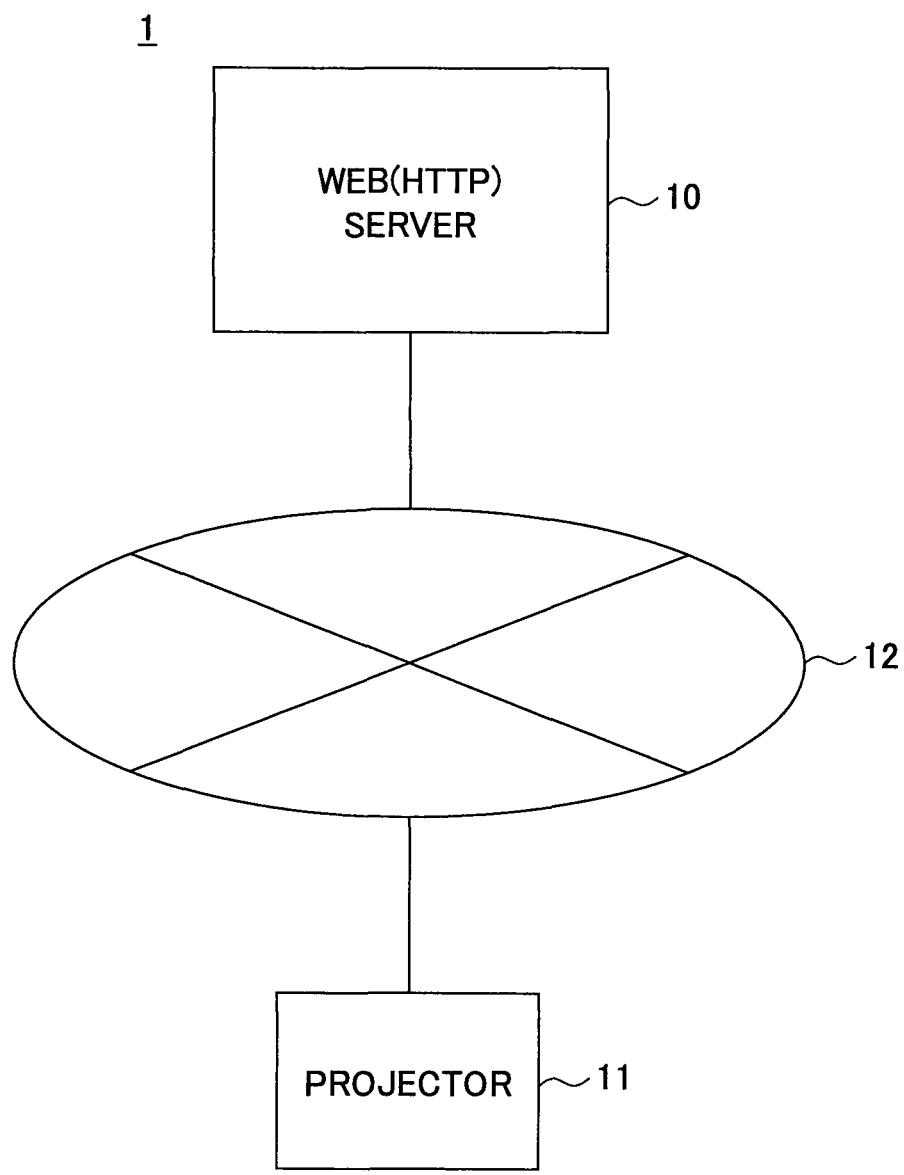
FIG. 1 shows an exemplary configuration of a projection system according to an embodiment of the present invention.

DESCRIPTION OF THE REFERENCE NUMERALS 1, 1A, 1B: PROJECTION SYSTEM
10: WEB (HTTP) SERVER
11, 11A, 11B, 11C, 11D: PROJECTOR
12: NETWORK
13: IC CARD AUTHENTICATION SERVER
21: REMOTE CONTROL
30: FILE LIST SCREEN
31: URL DISPLAY FIELD
32: FILE LIST DISPLAY FIELD
40: FILE PROJECTION SCREEN
41: IMAGE DISPLAY FIELD
42: OPERATIONS FIELD
50: SETTING SCREEN
51: AUTHENTICATION SCREEN
60: SERVER LIST SCREEN
100: NETWORK CONTROLLER
101: PROJECTION UNIT
102: OPERATIONS UNIT
111: SETTING VALUE STORAGE UNIT
112: URL GENERATING UNIT
113: UI SCREEN GENERATING UNIT
114: INDEX ANALYZING UNIT
115: INDEX OBTAINING UNIT
116: CONTENT FILE OBTAINING UNIT
117: IMAGE DECODER
118: SETTING COMMAND INTERPRETING UNIT
119: COMMUNICATION CONTROL UNIT
120: GRAPHIC DRIVER
121: OPERATIONS UNIT CONTROL UNIT
122: CERTIFICATE STORAGE UNIT
131: TIMER
132: STANDBY SCREEN CONTROL UNIT
133: AUTHENTICATION INFORMATION STORAGE UNIT
134: IC CARD AUTHENTICATION UNIT
200: CLIENT PC
201: JPEG CONVERSION TOOL

MODE FOR CARRYING OUT THE INVENTION

In the following, embodiments of the present invention are described with reference to the accompanying drawings. It is noted that a projector is described below as an exemplary embodiment of an image display apparatus of the present invention. Also, a projection system is described below as an exemplary embodiment of an image display system of the present invention. Further, projection by the projector corresponds to an exemplary manner of displaying image data by an image display apparatus.

First Embodiment

FIG. 1 is a diagram showing an exemplary configuration of a projection system 1 according to an embodiment of the present invention. In FIG. 1, the projection system 1 includes a web (HTTP) server 10 and a projector 11 that are connected to each other via a network 12 such as the Internet or a local area network (LAN) so that the web server 10 and the projector 11 may establish communication and exchange data. The web server 10 stores an image to be projected by the projector 11. The projector 11 has a client function for cooperating with the web server 10. The projector 11 uses the client function to obtain image data from the web server 10 and project the obtained image data as is described below.

Figure 2:
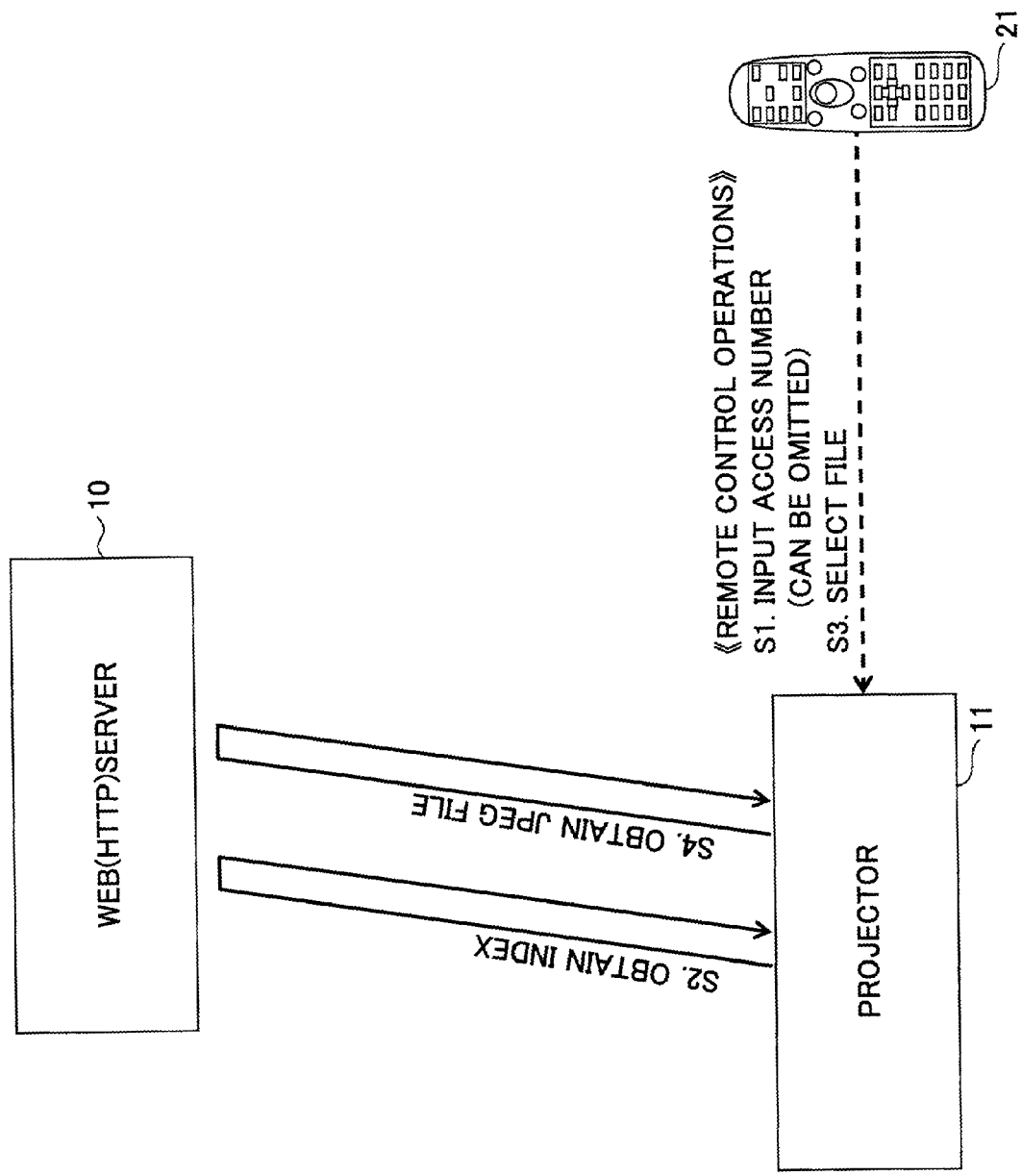
FIG. 2 shows exemplary process steps performed by the projection system of FIG. 1.

FIG. 2 is a diagram schematically showing exemplary process steps of the projection system 1. It is noted that the projection system 1 may allow access restriction to be optionally implemented. For example, the projection system 1 may be configured to implement access restriction based on an access number (access number-based access restriction) or may otherwise allow unrestricted access. In other examples, access control using an IC card or a fingerprint authentication device may be optionally implemented.

In the case where access number-based access restriction is implemented, an operator (user) inputs an access number to the projector 11 by operating a remote control 21, for example, after inputting a start command (e.g., command to project a file list screen) to the projector 11 (S1). It is noted that in a case where access is unrestricted, step S1 may be omitted.

In step S2, the projector 11 obtains an index file from the web server 10. The index file is an example of index information that includes information on image data stored in the web server 10. For example, the index file may include list information of the image data stored in the web server 10. In one specific example, the index file may include information on one or more content files registered in a directory and information on a subdirectory. The content file is an example of an image data file stored in the web server 10. For example, the content file may correspond to a still image file or a moving image file that is in a format projectable by the projector 11. In the illustrated example, a JPEG file is stored in the web server 10 as the content file.

In the case where access number-based access restriction is implemented, the index file obtained from the web server 10 includes information on the content file associated with the access number input by the operator. In the case where access is unrestricted, the index file includes information on all content files registered in a predetermined directory.

The projector 11 generates a file list screen based on the index file obtained from the web server 10 and projects the generated file list screen. In step S3, the operator of the projector 11 selects the content file to be projected from the file list screen by operating the remote control 21.

In step S4, the projector 11 obtains the content file selected by the operator from the web server 10. The projector 11 generates a file projection screen based on the content file obtained from the web server 10 and projects the generated file projection screen.

Figure 3:
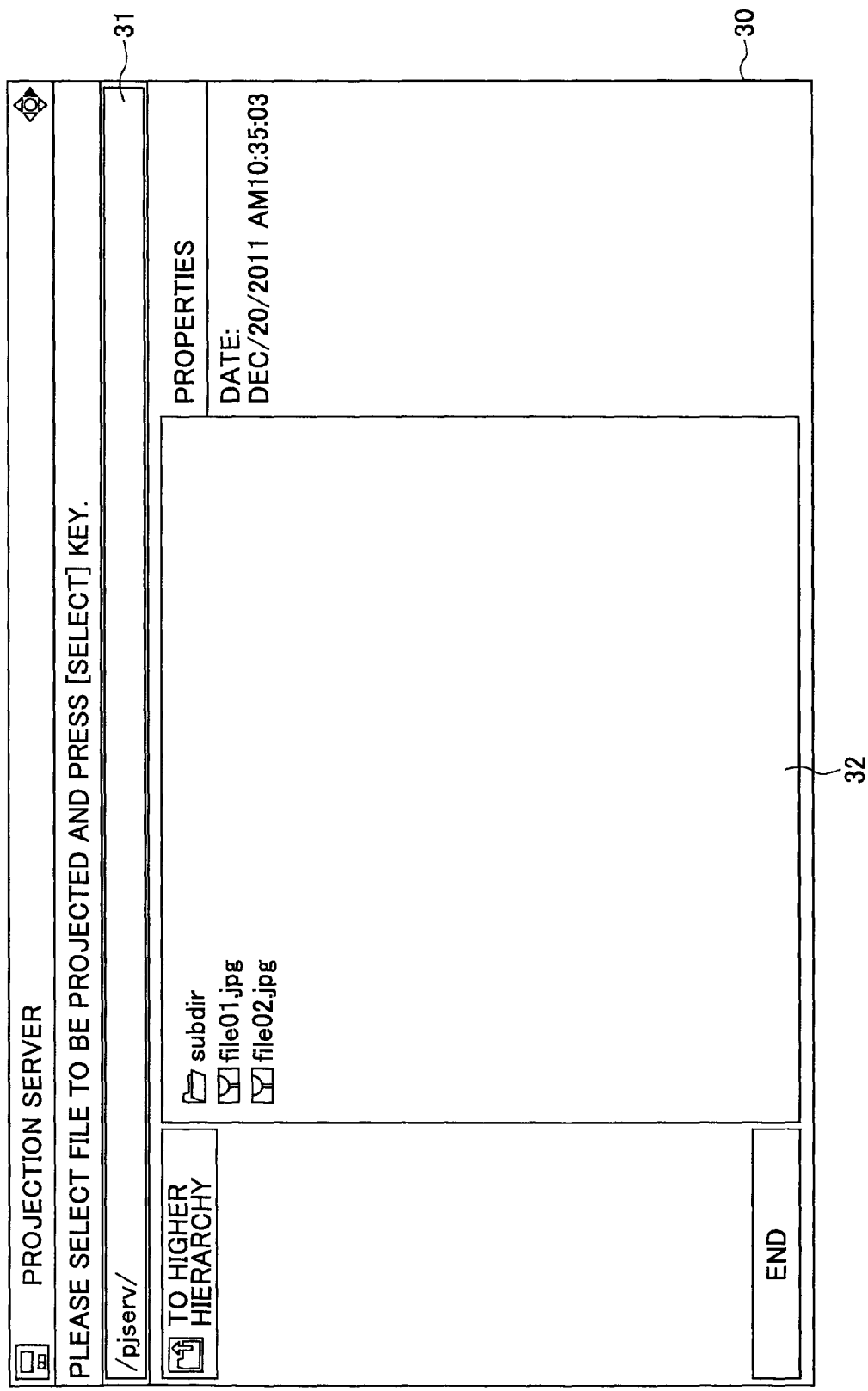
FIG. 3 shows an example of a file list screen.

FIG. 3 shows an example of the file list screen. The file list screen 30 shown in FIG. 3 includes a URL display field 31 and a file list display field 32. The URL display field 31 displays a portion of the root URL used to obtain the index file in step S2 of FIG. 2. For example, the URL display field may display a portion of the root URL that does not reveal the access number for gaining access to a content file. The file list display field 32 displays information on the subdirectory and content files included in the index file obtained from the web server 10.

Figure 4:
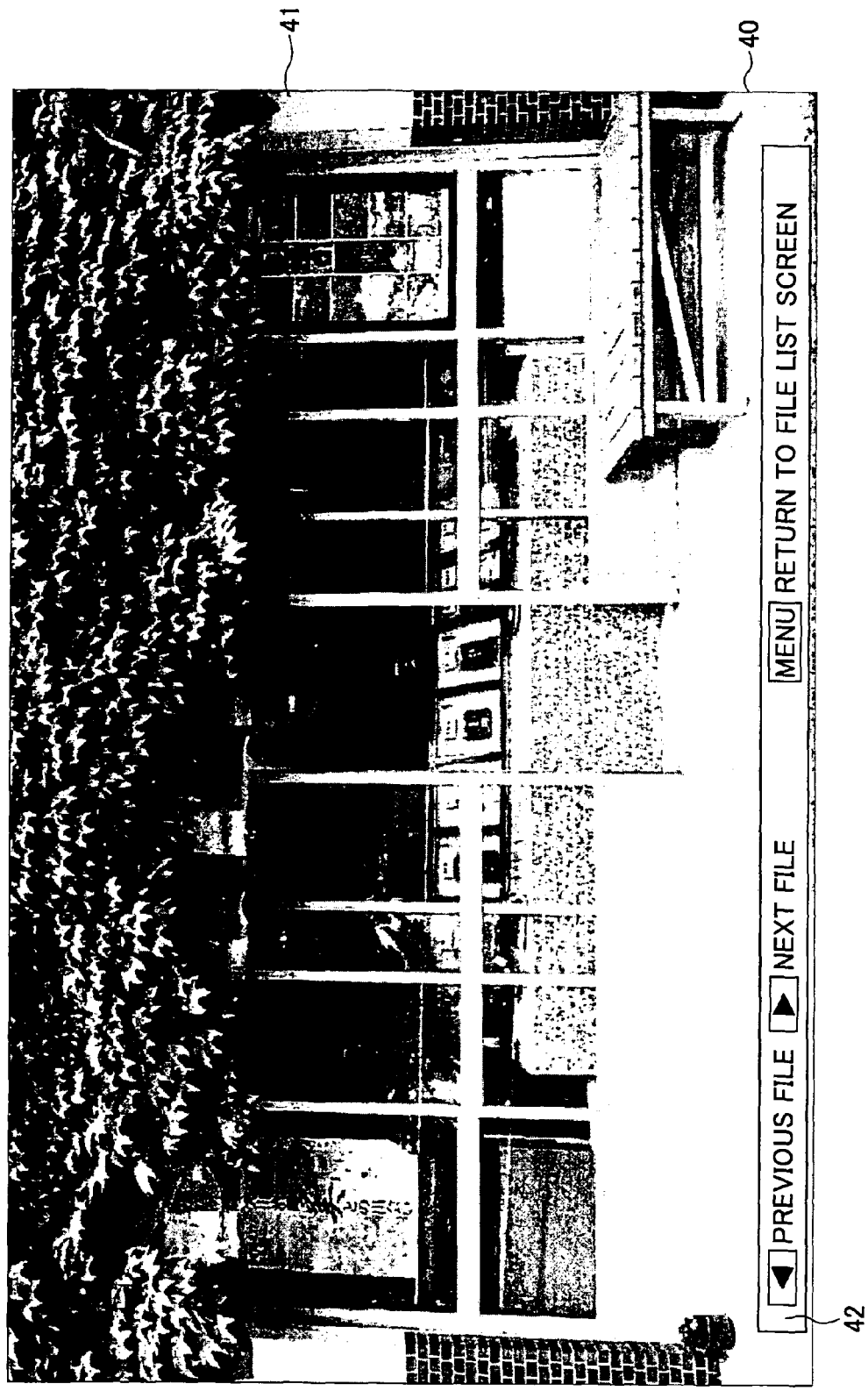
FIG. 4 shows an example of a file projection screen.

FIG. 4 shows an example of a file projection screen. The file projection screen 40 shown in FIG. 4 includes an image display field 41 and an operations field 42. The image display field 41 displays an image of the content file obtained from the web server 10. The operations field 42 includes descriptions of operation keys for switching the image being displayed (e.g., "PREVIOUS FILE" and "NEXT FILE"). In one embodiment, the image display field 41 may be switched between display mode and non-display mode through remote control operations.

For example, when a left key (e.g., hard function key of the projector main frame or button of the remote control) is pressed, the projector 11 may display an image of a content file that precedes the content file that is currently displayed in the image display field 41 (e.g., the content file with a file name that precedes the file name of the currently displayed content file alphabetically). When the right key is pressed, the projector 11 may display the image of the next content file coming after the content file that is currently being displayed in the image display field 41. By operating the left and right keys, the operator of the projector 11 may conduct a manual slide show. Also, the projector 11 may have an automatic slideshow function for displaying an image file for a predetermined time period before moving on to the next image file, for example.

Further, the projector 11 may have a read-ahead function and/or a caching function to accommodate the projection of content files in sequence or switching the content files back and forth through operation of the left and right keys upon projecting the file projection screen 40.

FIG. 5 shows an example of a setting screen. The setting screen 50 shown in FIG. 5 may be projected by the projector 11 and includes projection server settings such as a projection server validity setting, a root URL setting, an index file setting, and an access restriction type setting. In this illustrated example, the setting screen 50 indicates that the projector 11 is to project an image by downloading contents from a server via a network rather than using an external medium such as a USB memory or a PC.

The projection server validity setting is for specifying whether the projection server is valid or invalid. The root URL setting is for specifying the root URL of the web server 10 that stores the content file to be accessed. For example, in FIG. 5, "http://192.168.1.10/" is designated as the root URL. In other examples, "http://192.168.1.10:8080/pjserv/" or "http://www.example.com//pjserv/{n}/" where {n} represents the access number may be designated as the root URL, for example.

In a case where characters that may be input are limited by constraints of the setting screen 50 or constraints of the remote control 21, for example, the root URL setting may be input from an external tool using a web API (Application Programming Interface) as is described below.

The index file setting is for specifying the index file name. The access restriction type setting is for specifying whether access number-based access restriction is to be implemented or access is to be unrestricted.

It is noted that the projector 11 uses the setting values designated for the root URL setting and the index file setting in the setting screen 50 of FIG. 5 in obtaining the index file from the web server 10 in step S2 of FIG. 2. That is, the root URL and the index file name in the setting screen 50 are designated based on the configuration of the web server 10.

FIG. 6 is a table showing exemplary setting values designated for the root URL setting and the index file setting. FIG. 7 shows an exemplary configuration of a URL path of the web server 10 in the case where the setting values shown in FIG. 6 are designated for the root URL setting and the index file setting.

As is shown in FIG. 7, the index file "index.json" can be found in the directory of the root URL "http://192.168.1.10:8080/pjserv/". Also, the index file "index.json" can be found in the subdirectory "subdir/".

The index file included in the directory of the root URL (index file of the root directory) may be described in the format shown in FIG. 8, for example. The index file in the subdirectory may be described in the format shown in FIG. 9, for example.

FIG. 8 shows an exemplary configuration of an index file of a root directory. FIG. 9 shows an exemplary configuration of an index file of a subdirectory. In FIGS. 8 and 9, the index files are described using JSON (Javascript Object Notation). In other examples, the index files may be described using XML (Extensible Markup Language) or some other suitable data format.

In FIGS. 8 and 9 where the index files are described using JSON, the entire object is enclosed in curly brackets ({ }), a key and a corresponding value are separated by a colon (:), and pairs of the key and the value are separated by a comma (,). For example, "directory" (folder) or "file" may be described as the value for the "type" key, and a directory name or a file name may be described as the value for the "name" key.

It is noted that the index file shown in FIG. 8 indicates that the subdirectory "subdir", JPEG files "file01.jpg" and "file02.jpg" are included in the root URL directory. The index file shown in FIG. 9 indicates that JPEG files "slide001.jpg" and "slide002.jpg" are included in the subdirectory.

Figure 11:
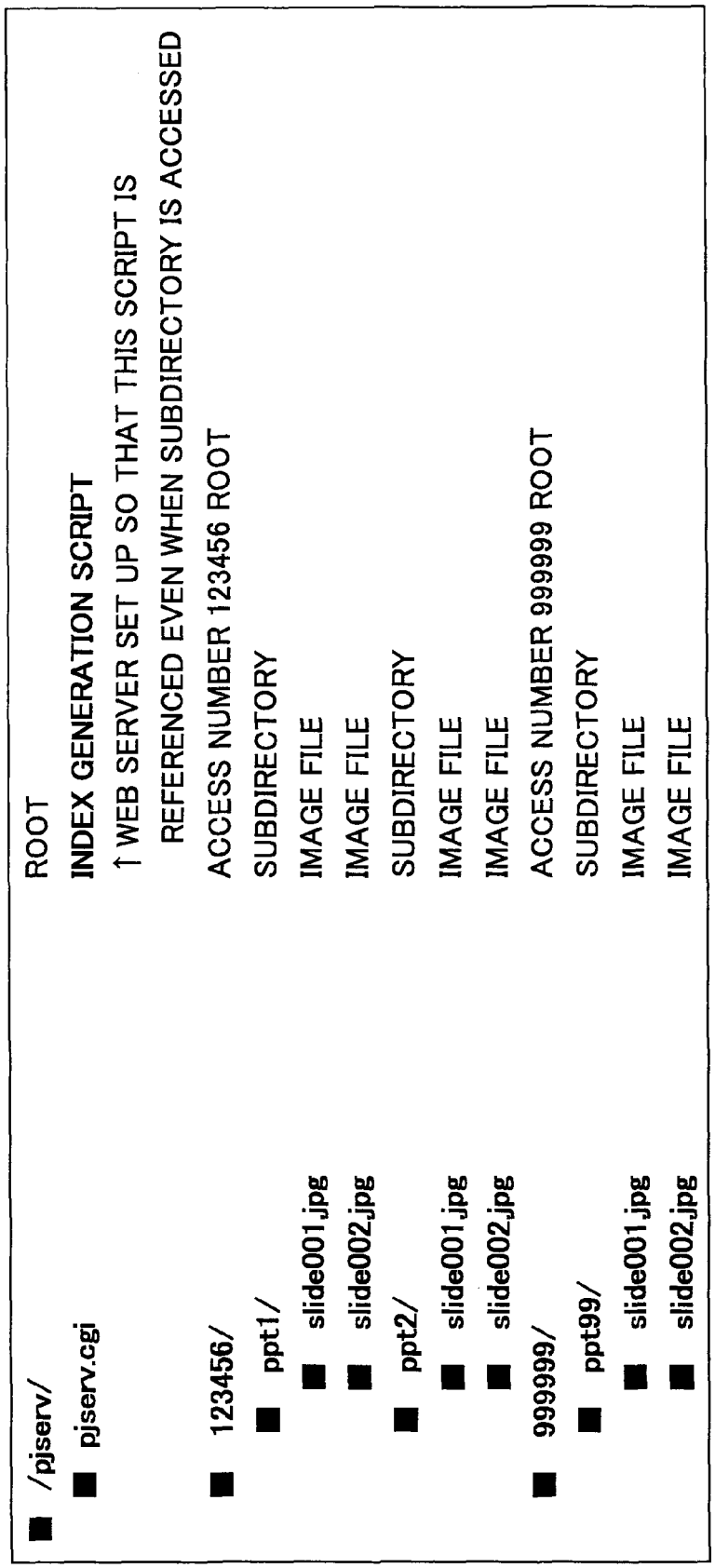
FIG. 11 shows another exemplary configuration of a URL path of the web server.

FIG. 10 is a table showing another exemplary set of setting values designated for the root URL setting and the index file setting. FIG. 11 shows another exemplary configuration of the URL path of the web server 10 in the case where the setting values shown in FIG. 10 are designated for the root URL setting and index file setting.

As is shown in FIG. 11, an index generation script "pjserv.cgi" can be found in the directory of the root URL "http://www.example.com/pjserv/". The web server 10 is set up so that the index generation script "pjserv.cgi" included in the root URL directory is started even when URLs of subdirectories such as "123456/" and "123456/ppt1" are accessed.

The index generation script "pjserv.cgi" dynamically generates indexes such as those shown in FIGS. 12 and 13 by scanning each directory. FIG. 12 shows an exemplary configuration of the index file of the subdirectory "123456/". FIG. 13 shows an exemplary configuration of the index file of the subdirectory "999999/ppt99/".

It is noted that the index files of FIGS. 12 and 13 are described in the JSON format as in FIGS. 8 and 9. For example, the index file shown in FIG. 12 indicates that subdirectories "ppt1/" and "ppt2/" are included in the subdirectory "123456/". The index file shown in FIG. 13 indicates that JPEG files "slide001.jpg" and "slide002.jpg" are included in the subdirectory "999999/ppt99/".

As can be appreciated from the URL path shown in FIG. 7, for example, the directories are arranged into a hierarchical structure. In the URL path shown in FIG. 7, an index file is provided at each hierarchy.

Figure 14:
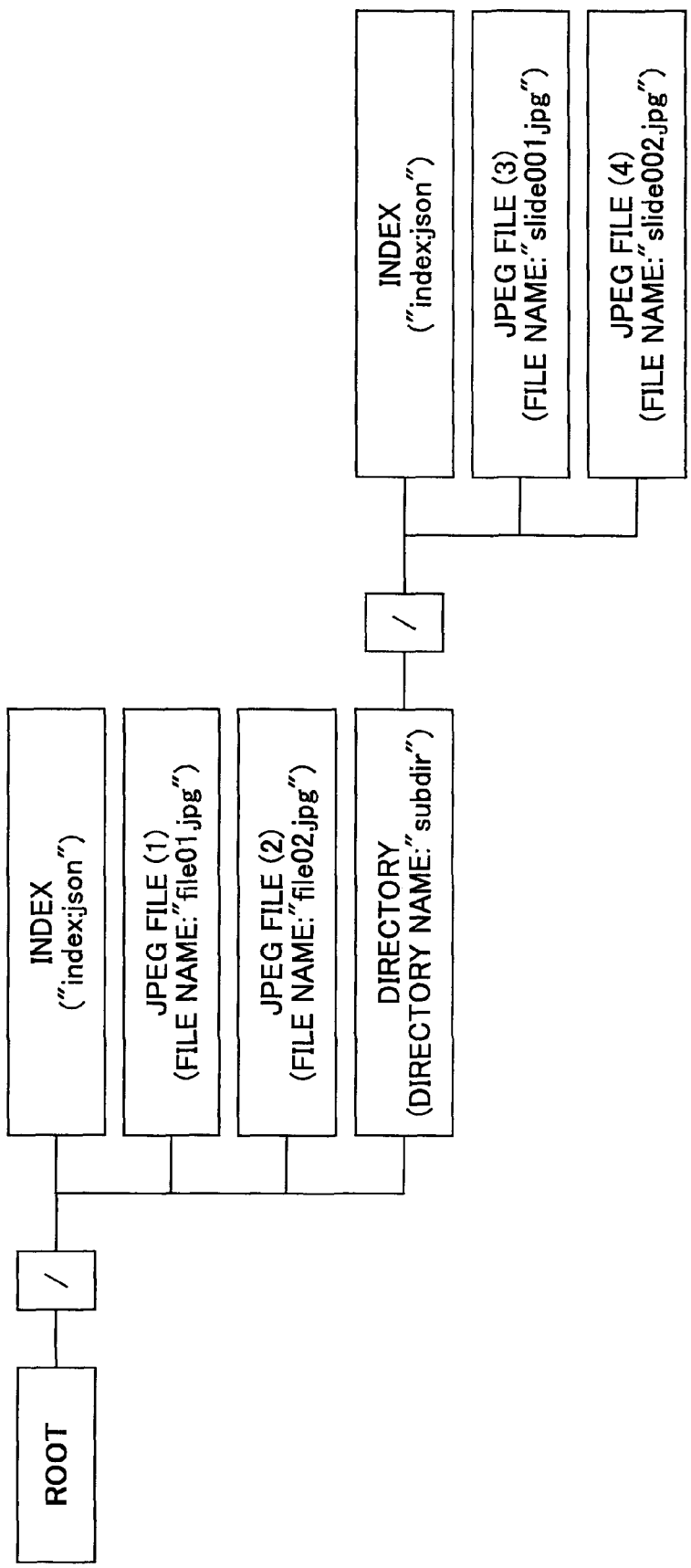
FIG. 14 shows an exemplary hierarchical structure of a URL path.

FIG. 14 illustrates the hierarchical structure of the URL path of FIG. 7. As is shown in FIG. 14, the URL to be included in a request to be sent to the web server 10 may be generated by connecting the root URL, the subdirectory name, and the file name with a separator "/".

It is noted that an index file of the present embodiment may be regarded as a resource describing a directory. Thus, a resource according to the present embodiment may be defined by an index file and a content file (JPEG file). The index file includes information on the content files and subdirectories registered under a directory.

The projector 11 may refer to the index file of a current directory to descend to the subdirectories nested under the current directory. On the other hand, to ascend to the parent directory, the projector 11 needs the index file of the parent directory. In the present embodiment, the projector 11 is arranged to generate the URL so that the hierarchy of the directory matches the hierarchy of the URL (does not include the information on the parent directory in the index file).

Figure 15:
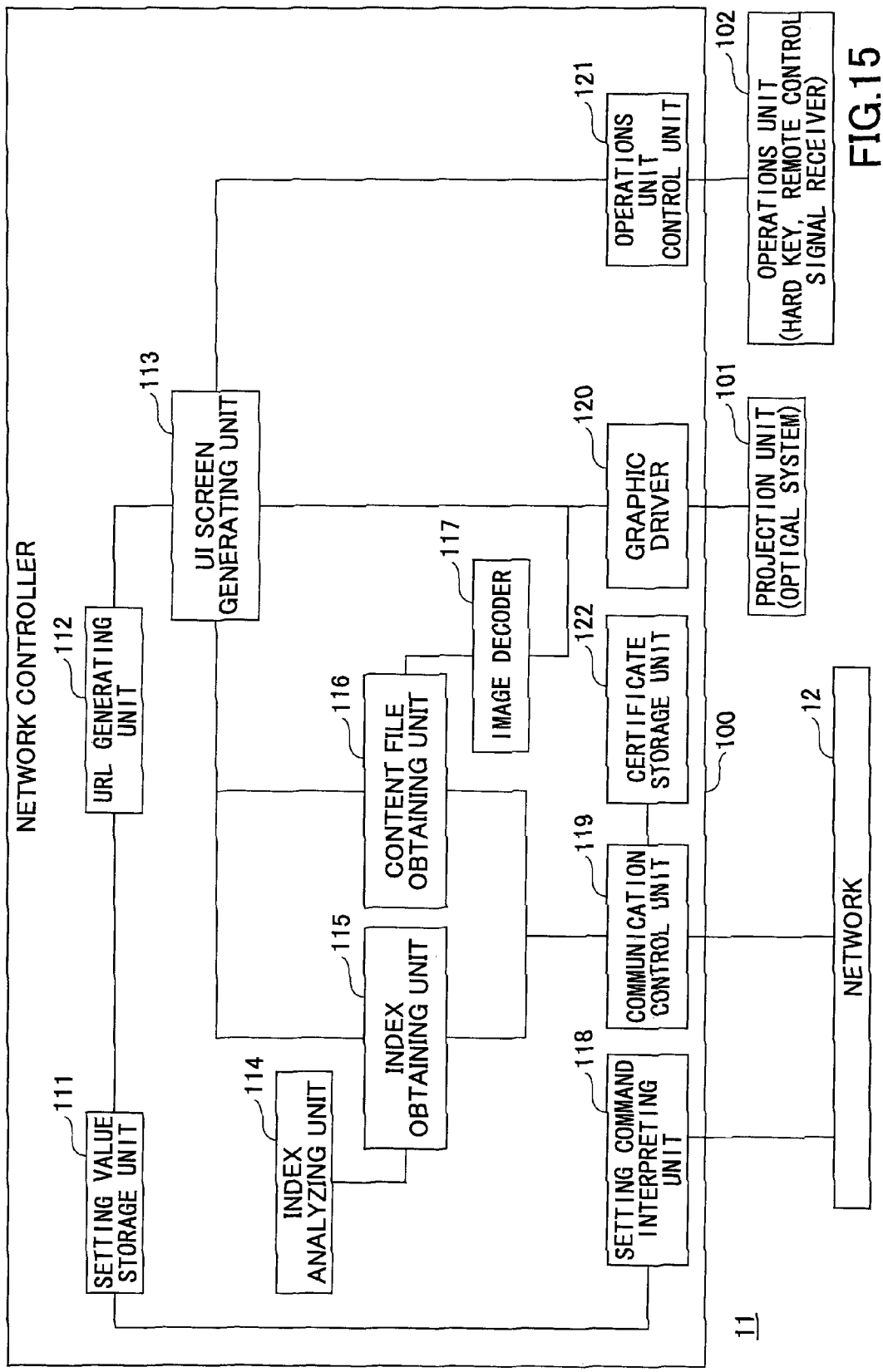
FIG. 15 is a block diagram showing an exemplary configuration of a projector according to a first embodiment of the present invention.

FIG. 15 shows an exemplary configuration of the projector 11. In FIG. 15, the projector 11 includes a network controller 100, a projection unit (optical system control unit) 101, and an operations unit (hard keys and remote control signal receiver) 102. The network controller 100 includes a setting value storage unit 111, a URL generating unit 112, a UI (user interface) screen generating unit 113, an index analyzing unit 114, an index obtaining unit 115, a content file obtaining unit 116, an image decoder 117, a setting command interpreting unit 118, a communication control unit 119, a graphic driver 120, an operations unit control unit 121, and a certificate storage unit 122.

The projection unit 101 includes a control unit for controlling an optical system that projects an image. The operations unit 102 includes hard keys and a receiving unit for receiving an optical signal from the remote control 21 that is operated by a user.

The setting value storage unit 111 of the network controller 100 stores a setting value that has been registered via the setting screen 50 shown in FIG. 5 in a permanent memory. The setting command interpreting unit 118 interprets a setting value input from an external tool using a web API and stores the setting value in the setting value storage unit 111. The external tool may be connected to the projector 11 via the network 12. It is noted that the web API is described in detail below.

The communication control unit 119 controls HTTP communications and HTTPS communications between the projector 11 and the web server 10 via the network 12. The UI screen generating unit 113 generates UI (user interface) screens such as the file list screen 30, the file projection screen 40, and the setting screen 50. The graphic driver 120 prompts the projection unit 101 to project the UI screen generated by the UI screen generating unit 113.

The operations unit control unit 121 controls the operations unit 102, and notifies the UI screen generating unit 113 of an operation input made by a user via the operations unit 102.

The URL generating unit 112 uses the setting value stored in the setting value storage unit 111 to generate a URL for obtaining an index file or a content file and sends the generated URL to the UI screen generating unit 113.

The index obtaining unit 115 obtains an index file from the web server 10 using the communication control unit 119 based on an instruction from the UI screen generating unit 113. The index analyzing unit 114 analyzes the obtained index file and converts the index file into a format that may be processed by the UI screen generating unit 113. For example, the index analyzing unit 114 may convert text data in the JSON format into structural data that may be processed by the UI screen generating unit 113. The index obtaining unit 115 sends index information that is converted into a format that may be processed by the UI screen generating unit 113 to the UI screen generating unit 113.

The content file obtaining unit 116 obtains a content file from the web server 10 using the communication control unit 119 based on an instruction from the UI screen generating unit 113. The image decoder 117 decodes the content file obtained by the content file obtaining unit 116 into a bitmap file, loads the bitmap in a memory (frame buffer), and sends the bitmap to the graphic driver 120. The graphic driver 120 synthesizes the bitmap with the file projection screen 40 generated by the UI screen generating unit 113 and directs the projection unit 101 to project the synthesized file projection screen (bitmap). The certificate storage unit 122 stores a digital certificate used for server authentication and user authentication when the communication control unit 119 establishes HTTPS communication.

Figure 16:
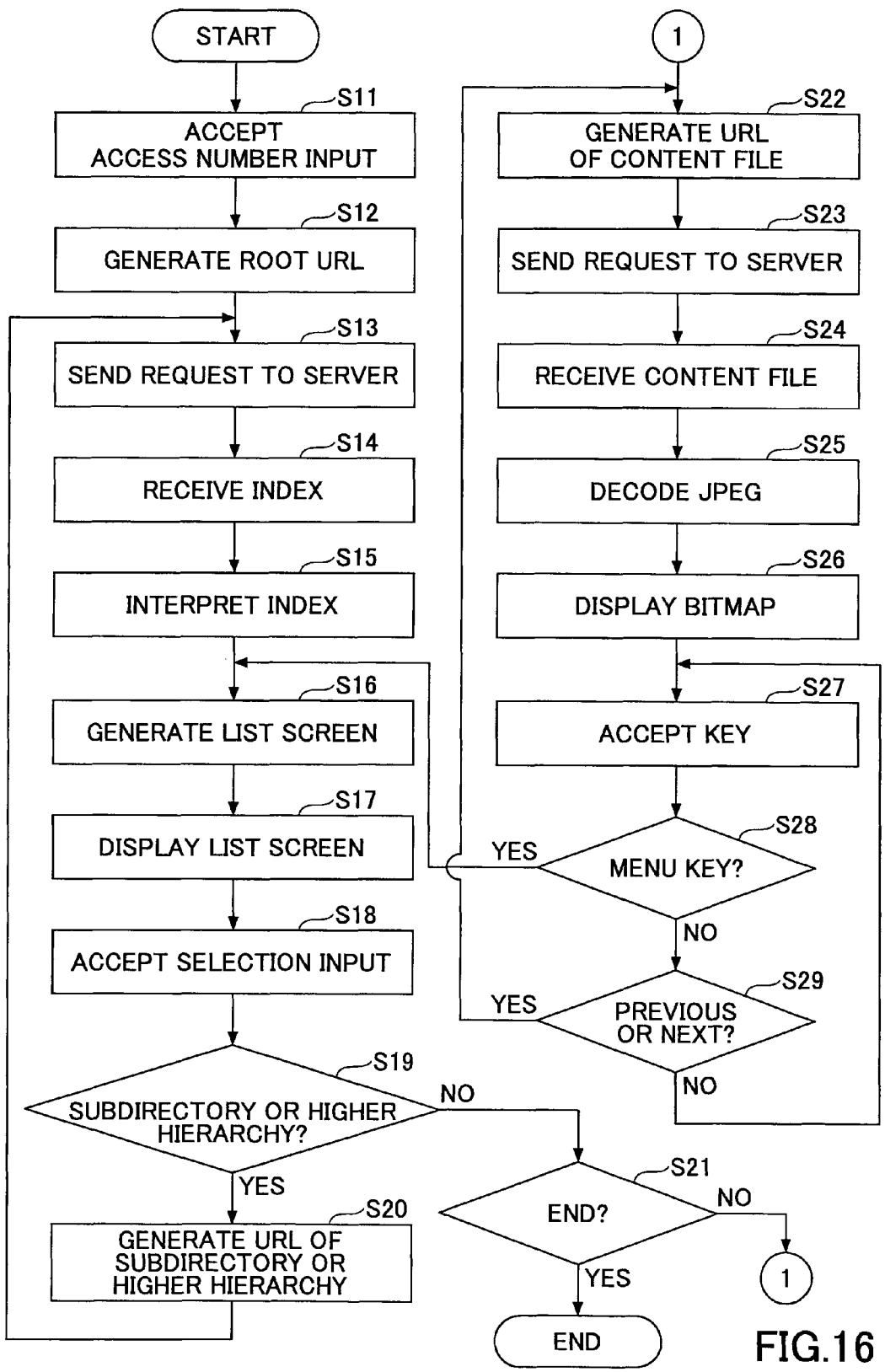
FIG. 16 is a flowchart showing exemplary process steps performed by the projector of FIG. 15.

FIG. 16 is a flowchart showing exemplary process steps performed by the projector 11. The process of FIG. 16 may be started in response to accepting a start command input by the operator operating the remote control 21, for example.

In step S11, the operations unit control unit 121 accepts an access number input by the operator via the operations unit 102. The operations unit control unit 121 notifies the UI screen generating unit 113 of the access number input. It is noted that in a case where access is unrestricted, step S11 may be skipped.

In step S12, the UI screen generating unit 113 directs the URL generating unit 112 to generate a root URL. The URL generating unit 112 uses the setting values stored in the setting value storage unit 111 to generate a URL for obtaining an index file, and notifies the UI screen generating unit 113 of the generated URL. It is noted that detailed process steps for generating the URL are described below.

In step S13, the UI screen generating unit 113 designates the URL for obtaining the index file and directs the index obtaining unit 115 to obtain the index file. The index obtaining unit 115 sends a request to the web server 10 via the communication control unit 119 to obtain the index file designated by the UI screen generating unit 113.

In step S14, the index obtaining unit 115 receives the requested index file from the web server 10 via the communication control unit 119. In step S15, the index analyzing unit 114 analyzes the received index file and converts the index file into a format that may be processed by the UI screen generating unit 113. The index obtaining unit 115 then sends the converted index information to the UI screen generating unit 113.

In step S16, the UI screen generating unit 113 generates a file list screen 30 such as that shown in FIG. 3 based on the received index information. In step S17, the UI screen generating unit 113 directs the graphic driver 120 to project the file list screen 30. In turn, the graphic driver 120 controls the projection unit 101 to project the file list screen 30.

The operator of the projector 11 may operate the remote control 21 to select from the file list screen 30 a content file to be projected, a subdirectory, a higher hierarchy, or an end command, for example. In step S18, the operations unit control unit 121 accepts the operation (selection input) made by the operator via the operations unit 102. The operations unit control unit 121 notifies the UI screen generating unit 113 of the selection input made by the operator.

In step S19, the UI screen generating unit 113 determines whether the accepted selection input is for the subdirectory or the higher hierarchy. If the accepted selection input is for the subdirectory or the higher hierarchy (S19, YES), the UI screen generating unit 113 performs step S20. In step S20, the UI screen generating unit 113 directs the URL generating unit 112 to generate a URL for the subdirectory or the higher hierarchy.

The URL generating unit 112 uses the setting values stored in the setting value storage unit 111 and the received index information to generate a URL for obtaining the index file of the subdirectory or the higher hierarchy and notifies the UI screen generating unit 113 of the generated URL. It is noted that detailed process steps for generating the URL in step S20 are described below.

Upon receiving notification of the generated URL for obtaining the index file of the subdirectory or the higher hierarchy, the UI generating unit 113 goes back to step S13 and designates the URL for obtaining the index file of the subdirectory or the higher hierarchy and directs the index obtaining unit 115 to obtain the designated index file.

On the other hand, when the accepted selection input is not for the subdirectory or the higher hierarchy (S19, NO), the UI screen generating unit 113 proceeds to step S21 and determines whether the accepted selection input is the end command. If the selection input is the end command (S21, YES), the UI screen generating unit 113 ends the process of FIG. 16.

If the accepted selection input is not the end command (S21, NO), the UI screen generating unit 113 determines that the accepted selection input is for a content file and proceeds to step S22 in which it directs the URL generating unit 112 to generate a URL for obtaining the selected content file. It is noted that detailed process steps for generating the URL in step S22 are described below.

In step S23, the UI screen generating unit 113 designates the URL for obtaining the selected content file and directs the content file obtaining unit 116 to obtain the selected content file from the web server 10. The content file obtaining unit 116 sends a request to the web server 10 via the communication control unit 119 to obtain the selected content file designated by the UI screen generating unit 113.

In step S24, the content file obtaining unit 116 receives the selected content file from the web server 10 via the communication control unit 119. In step S25, the image decoder 117 decodes the obtained content file (e.g., JPEG file) into a bitmap file, loads the bitmap in a memory (frame buffer), and sends the bitmap to the graphic driver 120.

In step S26, the UI screen generating unit 113 generates a file projection screen 40 such as that shown in FIG. 4. The UI screen generating unit 113 directs the graphic driver 120 to project the generated file projection screen. The graphic driver 120 synthesizes the bitmap with the file projection screen 40 generated by the UI screen generating unit 113. The graphic driver 120 prompts the projection unit 101 to project the synthesized file projection screen 40 (bitmap).

The operator of the projector 11 may operate the remote control 21 to execute operations indicated in the operations field 42 of the file projection screen 40 (see FIG. 4). In step S27, the operations unit control unit 121 accepts a key input made by the operator via the operations unit 102. The operations unit control unit 121 notifies the UI screen generating unit 113 of the accepted key input. In step S28, the UI screen generating unit 113 determines whether the accepted key input corresponds to a menu button.

If the accepted key input corresponds to the menu button (S28, YES), the UI screen generating unit 113 goes back to step S16 to generate and display the file list screen 30. If the accepted key input does not correspond to the menu button (S28, NO), the UI screen generating unit 113 proceeds to step S29.

In step S29, the UI screen generating unit 113 determines whether the accepted key input corresponds to the left key ("PREVIOUS FILE") or the right key ("NEXT FILE"). If the accepted key input corresponds to the left key ("PREVIOUS FILE") or the right key ("NEXT FILE") (S29, YES), the UI screen generating unit 113 refers to index information stored in a memory to determine the content file name of the previous or next content file in alphabetical order. Then, the process goes back to S22 to project on the file projection screen 40 the image of the previous or next content file coming before or after the content file that is currently projected in the image display field 41. If the accepted key input does not correspond to the left key or the right key (S29, NO), the UI screen generating unit 113 goes back to step S27.

FIGS. 17A and 17B illustrate exemplary ways of generating a URL in step S12 of FIG. 16. FIG. 17A illustrates an exemplary manner of generating a URL for obtaining an index file in a case where no access restrictions are implemented (i.e., access number invalid). FIG. 17B illustrates an exemplary manner of generating a URL for obtaining an index file in a case where an access number-based access restriction is implemented (i.e., access number valid). It is noted that in FIGS. 17A and 17B, "CURRENT HIERARCHY" refers to a portion of the URL corresponding to the hierarchy (directory) represented by the file list screen that is currently being displayed. The UI screen generating unit 113 stores the value in a memory and the file list screen 30 displays this value in the URL display field 31.

FIGS. 18A and 18B illustrate exemplary ways of generating a URL in step S20 of FIG. 16. FIG. 18A illustrates an exemplary manner of generating a URL for obtaining an index file of a subdirectory in a case where the selection input is for a subdirectory. FIG. 18B illustrates an exemplary manner of generating a URL for obtaining an index file of the higher hierarchy (parent directory) in a case where the selection input is for the higher hierarchy. It is noted that FIGS. 18A and 18B illustrate exemplary cases in which an access number-based access restriction is not implemented. In a case where an access number-based access restriction is implemented, the root URL may be arranged to have an access number embedded therein as is shown in FIG. 17B.

FIG. 19 illustrates an exemplary manner of generating a URL for obtaining a content file in step S22 of FIG. 16. When the selection input is for a content file, the UI screen generating unit 113 has the URL generating unit 112 generate a URL for obtaining the selected content file. It is noted that FIG. 19 shows an example in which an access number-based access restriction is not implemented. In a case where an access number-based access restriction is implemented, the access number may be embedded in the root URL.

Figure 20:
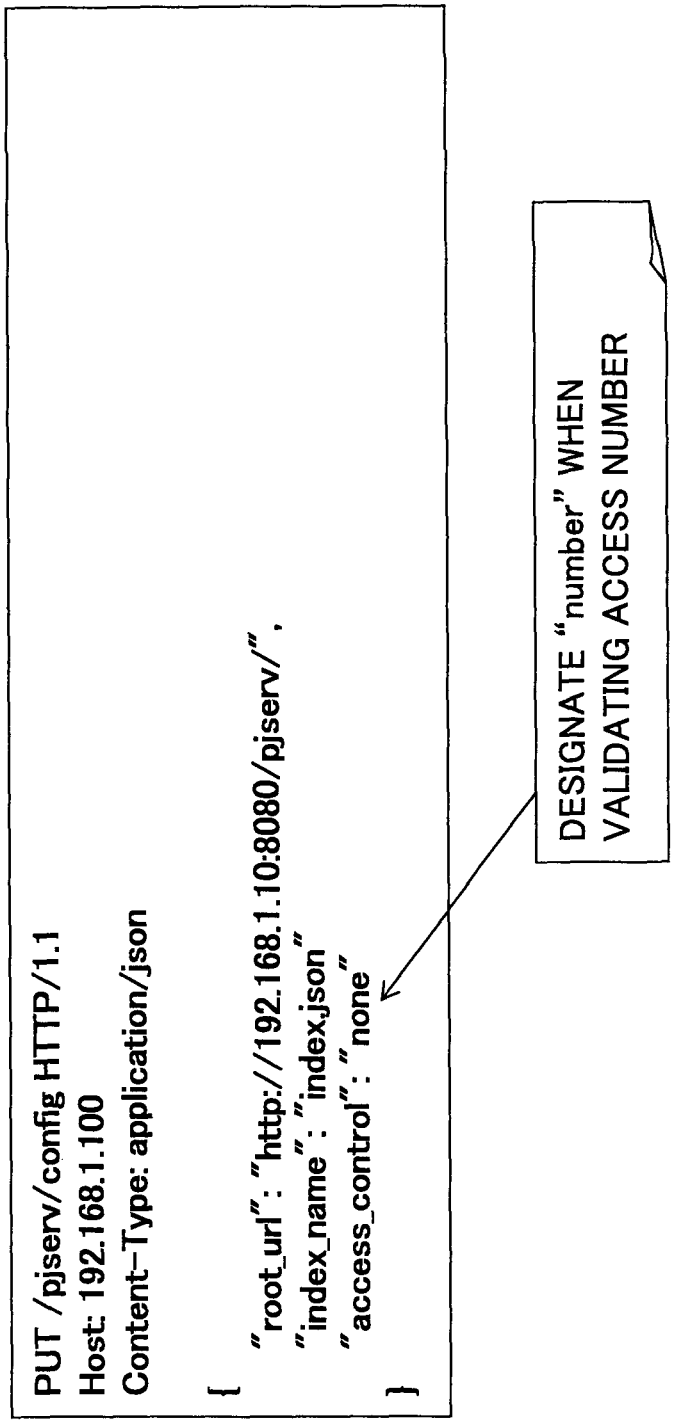
FIG. 20 shows an exemplary web API that may be used to designate a setting value from an external tool.

FIG. 20 shows an exemplary web API that may be used to designate a setting value from an external tool. The setting command interpreting unit 118 interprets the web API shown in FIG. 20 that is accepted in the form of an HTTP request and changes the setting values stored in the setting value storage unit 111. In the illustrated example, the setting command is described in the JSON format, where "root_url", "index_name", and "access_control" designate settings for the root URL, index file, and the access restriction type, respectively. It is noted that FIG. 20 illustrates an example in which an access number-based access restriction is not to be implemented. In a case where an access number-based access restriction is to be implemented, the setting value "none" included in the HTTP request of FIG. 20 may be changed to "number", for example.

In a case where HTTPS is designated as the root URL (e.g., "https://192.168.1.10/"), the projector 11 performs server authentication and client authentication as described below. The certificate storage unit 122 of the projector 11 may store CA certificates to be used for verifying a server certificate including a first CA (certificate authority) certificate that cannot be updated or deleted by a user and a given second CA certificate that may be replaced. It is noted that the certificate storage unit 122 may store other types of certificates as well.

The projector 11 uses the first and second CA certificates to perform SSL (Secure Socket Layer) server authentication. First, the projector 11 validates the server certificate using the first CA certificate. If the validation is successful, the projector 11 records a success log. Then, the projector 11 validates the server certificate using the second CA certificate. If the validation is successful, the projector records a success log. It is noted that even when one or more of the validation checks using the first CA certificate and the second CA certificate is not successful, the projector 11 may continue communications with the server. In this case, the projector 11 may record a failure log.

The server authentication is performed to prevent an unauthorized server from posing as the web server 10 as viewed by the projector 11. When an unauthorized web server gains access to a client function cooperating with the web server 10, there is a risk of an access number being leaked.

However, even if the access number is leaked, the unauthorized web server may be detected since it will be unable to send the appropriate contents. Also, an access number leakage on one occasion may not pose such a threat if the access number is not arranged to be the same as other security information such as IDs and passwords and if the access number can be easily changed. Thus, the projector 11 may continue communications with the server even when a server validation check fails. In certain embodiments, the projector 11 may display server certificate information and enable the operator to select whether to continue communications, or the projector 11 may allow settings to be switched between automatically continuing communications or enabling selection by the operator.

The certificate storage unit 122 may also store client certificates including a first device certificate that cannot be updated or deleted by a user and a given second device certificate that may be replaced. It is noted that the certificate storage unit 122 may store other types of certificates as well.

When the projector 11 receives a request for a client certificate from the web server 10 during an SSL handshake, the projector 11 may respond in the following manner. In the case where server validation using the first CA certificate has been successful, the projector 11 sends the first device certificate to the web server 10. In a case where the validation of the server certificate using the first CA certificate has not been successful, the projector 11 terminates the communication.

The client authentication is performed in order to prevent an unauthorized projector from posing as the projector 11 as viewed by the web server 10. When an unauthorized projector gains access to a client function cooperating with the web server 10, there is a risk of content leakage.

Content leakage may pose a serious threat depending on the information content that is exposed. In order to be authenticated as a valid client, the projector 11 must send an appropriate client certificate that is administered by the web server 10 upon receiving a request for a client certificate from the web server 10. For example, in the case where validation of the server certificate has been successful using the second CA certificate, the projector 11 may send the second device certificate to the web server 10 as the client certificate administered in the web server 10. In certain embodiments, even in the case where the validation of the server certificate has failed with both the first and second CA certificates, the projector 11 may send at least one of the first or second device certificates. Also, the projector 11 may enable the operator to select the device certificate to be sent to the web server 10, or allow settings to be switched between sending the first device certificate and the second device certificate, for example.

It is noted that the first CA certificate and/or the first device certificate may be written in the client device (projector) by the device manufacturer/distributor upon shipment, delivery, or purchase by a customer, for example. The first CA certificate and/or first device certificate is arranged so that once it is written, it may not be updated or deleted by the user. In this way, a device certificate whose uniqueness is ensured by the manufacturer/distributor may be stored in each device (projector), and the web server 10 may obtain such device certificate during an SSL handshake with the projector 11. An application running on the web server 10 may refer to a CRM system to determine the customer associated with a device corresponding to the sender of a request so that differing content for each customer may be safely transmitted to a corresponding device.

Figure 21:
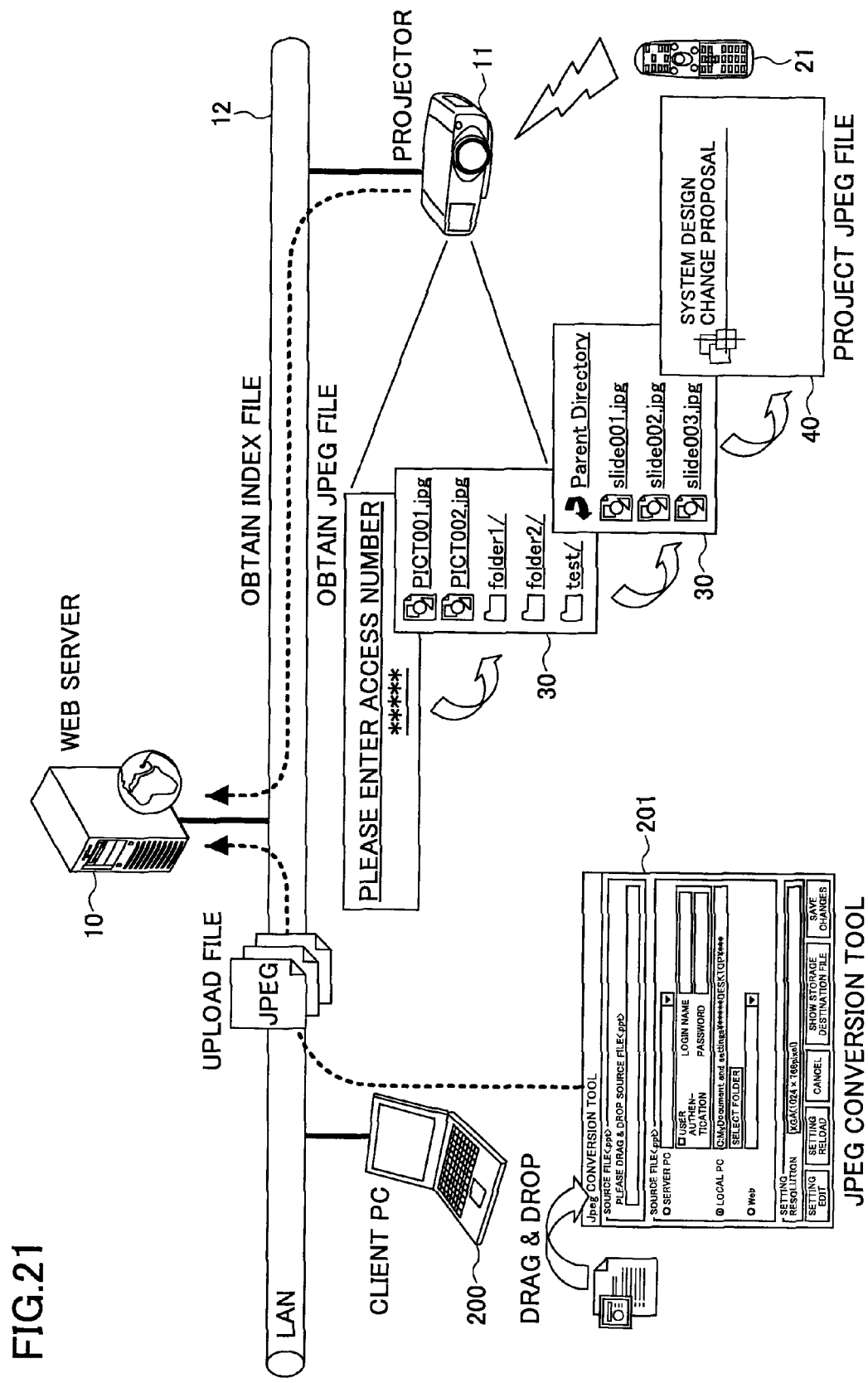
FIG. 21 shows an exemplary solution using the projector according to the first embodiment.

FIG. 21 shows an exemplary solution using the projector 11 according to the first embodiment.

In FIG. 21, the web server 10, the projector 11, and a client PC 200 are interconnected via the network 12 so that they may exchange data with each other. The client PC 200 includes a JPEG conversion tool 201 as an exemplary external tool. The operator of the projector 11 may drag and drop a file to be projected by the projector 11 (e.g., presentation software file) in the JPEG conversion tool 201.

The JPEG conversion tool 201 converts the drag-and-dropped file into a JPEG file and uploads the JPEG file in the web server 10. In one embodiment, the operator may upload the JPEG file from the client PC 200 in a region of web server 10 that is associated with an access number.

To have the projector 11 project the uploaded JPEG file, after inputting a start command to the projector 11, the operator may input the access number by operating the remote control 21, for example. In turn, the projector 11 obtains an index file including information on the JPEG file associated with the access number from the web server 10.

The projector 11 generates a file list screen 30 based on the index file obtained from the web server 10 and projects the generated file list screen 30. The operator of the projector 11 may operate the remote control 21 to have a file list screen 30 of a subdirectory or a higher hierarchy projected by the projector 11. The file list screen 30 includes information on the JPEG files and subdirectories associated with the access number.

The operator of the projector 11 operates the remote control 21 to select the JPEG file to be projected by the projector 11 from the file list screen 30. The projector 11 obtains the JPEG file designate by the operator from the web server 10. The projector 11 generates a file projection screen 40 based on the JPEG file obtained from the web server 10 and projects the generated file projection screen 40.

As can be appreciated, in FIG. 21, by using the JPEG conversion tool 201, a JPEG file to be projected by the projector 11 may be easily uploaded in the web server 10. Also, in FIG. 21, access number-based access restriction may be easily implemented.

The projector 11 according to the present embodiment is configured to obtain image data such as a JPEG file stored in the web server 10 and project the obtained image data. In this way, image data may be projected by the projector 11 without using an external medium such as a PC or USB memory storing the image data. According to an aspect of the present embodiment, convenience may be improved since image projection may be enabled without using an external medium such as a PC or USB memory storing the image data. According to another aspect of the present embodiment, since an external medium such as a PC or USB memory storing the image data does not have to be carried along with the projector 11, confidential information leakage due to loss of the PC or USB memory may be prevented.

According to another aspect of the present embodiment, by implementing an access number-based access restriction, the projector 11 may be arranged to project only contents associated with an access number that is input so that convenience may be improved. Also, a party that is unaware of the access number will be unable to project the contents so that unauthorized access to the contents may be prevented.

According to another aspect of the present embodiment, since the projector 11 has an HTTPS communication function and is capable of performing client authentication using a non-rewritable device certificate, the web server 10 may safely transmit differing contents to different customers.

According to another aspect of the present embodiment, since image data to be projected is stored in the web server 10, a system may be configured to enable plural projectors 11 to obtain and project the same image data stored in the web server 10.

According to another aspect of the present embodiment, by realizing a client function for cooperating with the web server 10, a flexible solution may be provided in which the projector 11 may be connected to various server systems according to the system environment of the user. However, since the projector 11 may be unable to rewrite software according to the various server systems, the web server 10 includes a predetermined interface (e.g., index file in JSON format) for enabling the projector 11 to establish connection with the web server 10. By employing a simple interface, additional software for establishing connection with the projector 11 may be easily developed at the server application side, for example.

Second Embodiment

A second embodiment of the present invention relates to an automatic slideshow function for displaying files one after the other at predetermined time intervals. It is noted that features of the second embodiment that may be identical to those of the first embodiment are given the same reference numerals and their descriptions are omitted.

Figure 22:
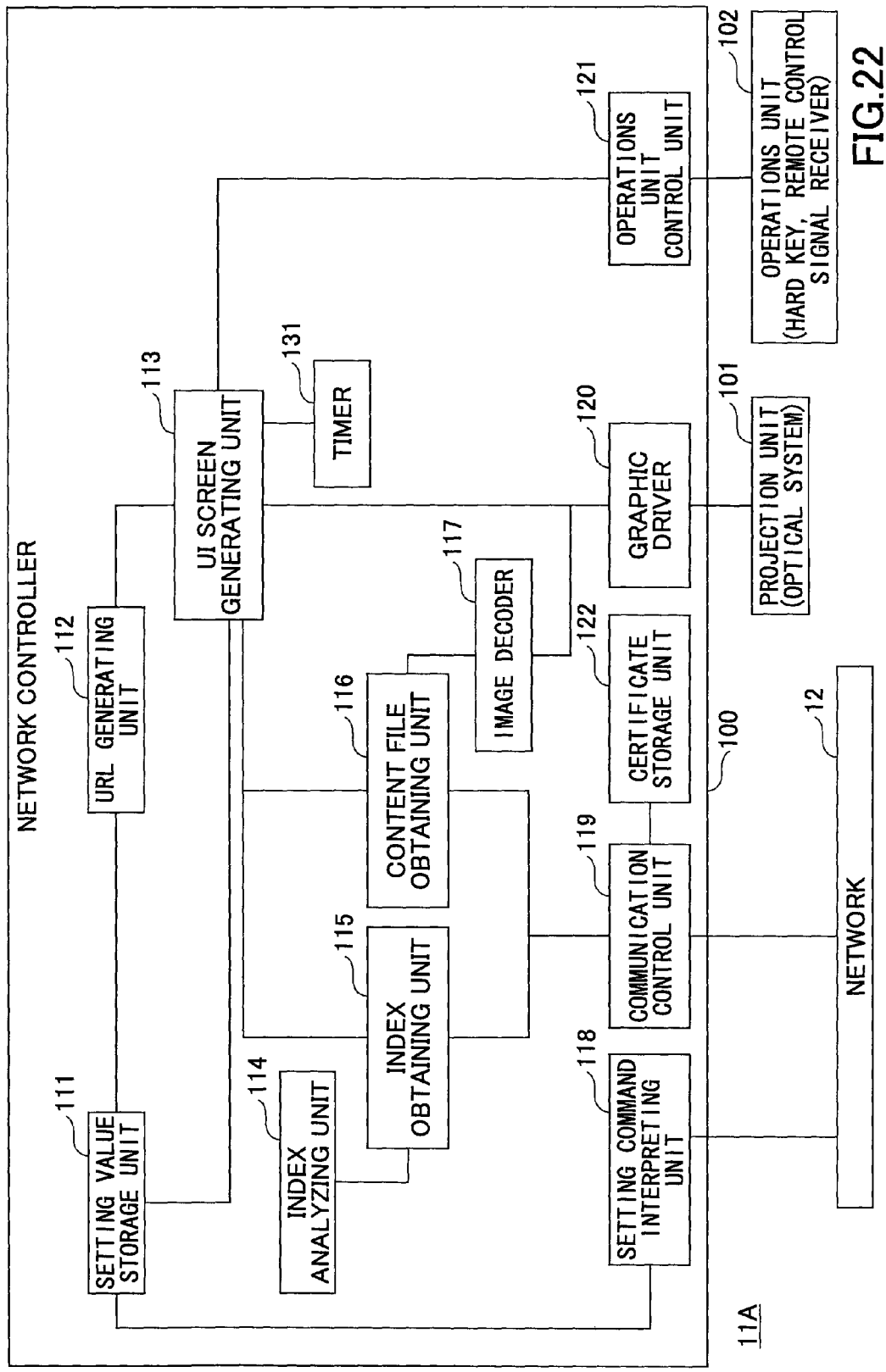
FIG. 22 is a block diagram showing an exemplary configuration of a projector 11A according to a second embodiment of the present invention.

FIG. 22 is a block diagram showing an exemplary configuration of a projector 11A according to the second embodiment. The projector 11A includes a timer 131 in addition to the components of the projector 11 shown in FIG. 15. The timer 131 measures the slideshow display interval. In the present embodiment, the setting screen 50 may be arranged to enable a setting value to be designated for a "slideshow display interval" setting. The "slideshow display interval" setting may indicate the switching interval of a slideshow (e.g., in seconds), for example.

For example, the UI screen generating unit 113 may use the setting value designated for the "slideshow display interval" setting stored in the setting value storage unit 111 and direct the timer 131 to measure the switching interval of a slideshow. The UI screen generating unit 113 may direct the content file obtaining unit 116 to obtain a next content file to be displayed after every slideshow switching interval so that a content file being projected may be switched at predetermined time intervals.

Figure 23:
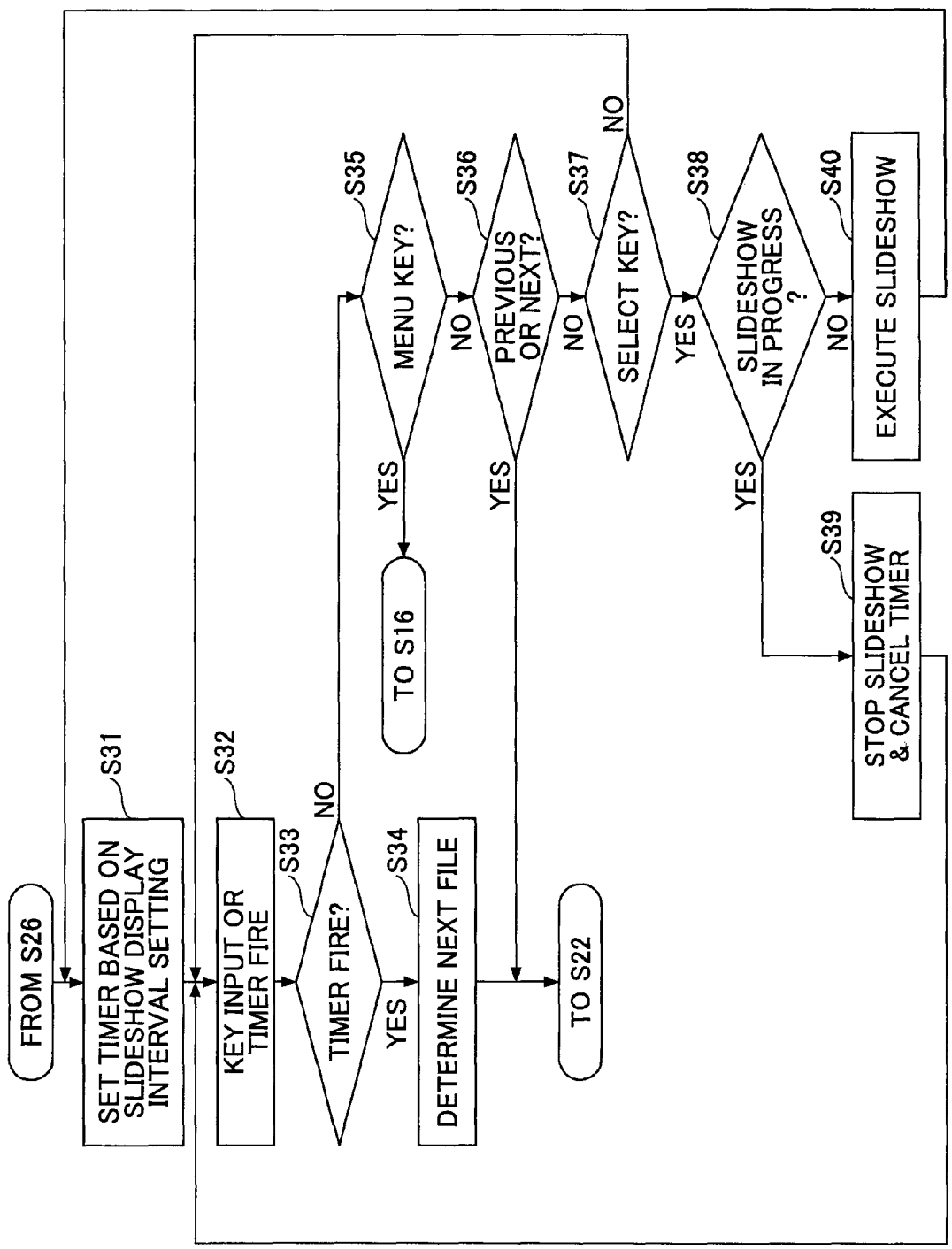
FIG. 23 is a flowchart showing exemplary process steps performed by the projector according to the second embodiment.

FIG. 23 is a flowchart showing exemplary process steps performed by the projector 11A. It is noted that process steps performed by the projector 11A before step S31 shown in FIG. 23 may be identical to steps S11-S26 shown in FIG. 16 so that their descriptions are omitted.

After performing step S26 of FIG. 16, the UI screen generating unit 113 may proceed to step S31 in a case where an automatic slideshow is in progress. It is noted that whether an automatic slideshow is in progress may be determined based on a status value stored in a memory, for example.

In step S31, the UI screen generating unit 113 refers to the value set up for the "slideshow display interval" setting that is stored in the setting value storage unit 111 and sets the timer 131 measure the slideshow display interval.

In step S32, the UI screen generating unit 113 may receive notification of a key input made by the operator and accepted via the operations unit 102 from the operations unit control unit 121 or receive notification of the elapse of the slideshow display interval (timer fire) from the timer 131.

In the case where the UI screen generating unit 131 receives notification of the elapse of the slideshow display interval (timer fire) (S33, YES), the UI screen generating unit 131 proceeds to step S34 to determine the next content file to be displayed after which the process goes back to step S22 of FIG. 16.

In the case where the UI screen generating unit 131 receives notification of a key input accepted via the operations unit 102 (S33, NO), the UI screen generating unit 113 proceeds to step S35 to determine whether the accepted key input corresponds to a menu button (menu key).

If the accepted key input corresponds to a menu button (S35, YES), the UI screen generating unit 113 goes back to step S16 to generate and project a file list screen 30. If the accepted key input does not correspond to the menu button (S35, NO), the UI screen generating unit 113 proceeds to step S36. In step S36, the UI screen generating unit 113 performs a process step similar to step S29. That is, the UI screen generating unit 113 determines whether the accepted key input corresponds to a left key ("PREVIOUS FILE") or a right key ("NEXT FILE"). If the accepted key input corresponds to the left key ("PREVIOUS FILE") or the right key ("NEXT FILE") (S36, YES), the UI screen generating unit 113 determines the file name of the previous or next content file to be displayed and goes back to step S22.

If the accepted key input does not correspond to the left key ("PREVIOUS FILE") or the right key ("NEXT FILE") (S36, NO), the UI screen generating unit 131 proceeds to step S37 to determine whether the accepted key input corresponds to a select button (select key).

If the accepted key input does not correspond to a select button (S37, NO), the UI screen generating unit 131 goes back to step S32. If the accepted key input corresponds to the select button (S37, YES), the UI screen generating unit 113 proceeds to step S38.

In step S38, the UI screen generating unit 113 determines whether an automatic slideshow is in progress. If an automatic slideshow is in progress (S38, YES), the UI screen generating unit 113 stops the automatic slideshow and cancels the time measuring operations of the timer 131 (S39), and goes back to step S32. On the other hand, if an automatic slideshow is not in progress (S38, NO), the UI screen generating unit 113 executes a new automatic slideshow and then returns to step S31.

It is noted that in a digital signage application that may be implemented by an image display apparatus such as a liquid crystal display arranged outdoors or at a storefront, for example, images are automatically updated without reliance on key operations. The present embodiment realizes an automatic slideshow function by downloading a file from the web server 10 and displaying the file at predetermined time intervals using the timer 131. Thus, the automatic slideshow function of the present embodiment may be effectively used to realize digital signage.

Third Embodiment

A third embodiment of the present invention relates to updating the index information retained by the UI screen generating unit 131. It is noted that features of the third embodiment that may be identical to those of the first and/or second embodiment are given the same reference numerals and their descriptions are omitted.

In the first embodiment, index information is updated when the directory is switched. When the projector 11 continues to project a content file based on index information initially obtained from the web server 10, the projector 11 may encounter issues when a content file is added or deleted at the web server 10.

For example, when the projector 11 continues to project a content file based on index information initially obtained from the web server 10, a content file that has been added later cannot be displayed. Also, when a content file is deleted at the web server 10, the projector 11 may be unable to obtain the content file. Accordingly, in the third embodiment, the index information retained by the UI screen generating unit 113 is arranged to be updated.

Figure 24:
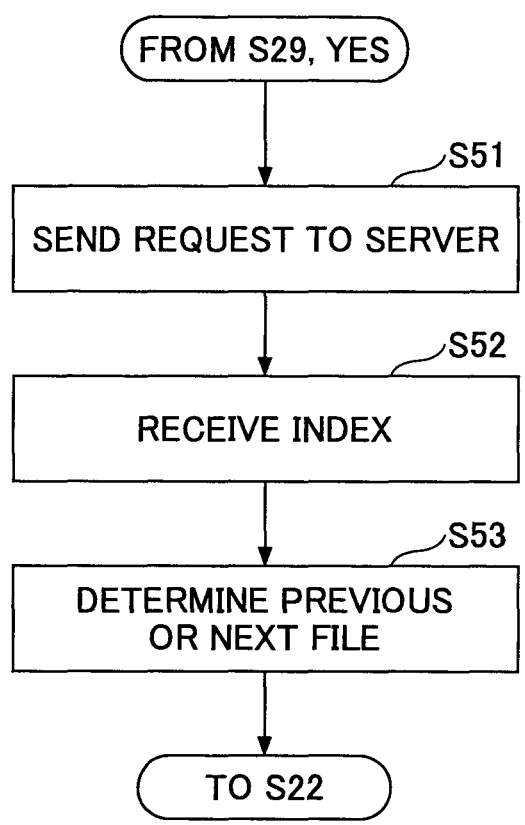
FIG. 24 is a flowchart showing exemplary process steps of the projector 11 according to a third embodiment of the present invention.

FIG. 24 is a flowchart showing exemplary process steps of the projector 11 according to the third embodiment. It is noted that process steps performed before step S51 of FIG. 24 may be identical to steps S11-S29 of FIG. 16 so that their descriptions are omitted.

In step S29 of FIG. 16, when the accepted key input corresponds to the left key or the right key (S29, YES), the UI screen generating unit 113 proceeds to step S51. In step S51, the UI screen generating unit 113 designates a URL for obtaining an index file and directs the index obtaining unit 115 to obtain the designated index file. The index obtaining unit 115 sends a request for the designated index file to the web server 10 via the communication control unit 119.

In step S52, the index obtaining unit 115 receives the designated index file from the web server 10 via the communication control unit 119. The index analyzing unit 114 analyzes the received index file. The UI screen generating unit 113 receives index information that is converted into a format that may be processed by the UI screen generating unit 113 from the index obtaining unit 115.

In step S53, the UI screen generating unit 113 determines the previous or next content file to be displayed and then goes back to step S22.

It is noted that the content file currently being displayed may possibly be deleted at the web server 10. Thus, in determining the previous or next file to be displayed in step S53, in the case where the currently displayed content file is deleted from the received index information, the UI screen generating unit 113 may additionally list the file name of the currently displayed content file in the index information according to alphabetical order, for example, and determine the previous or next content file coming before or after the currently displayed content file.

The process steps shown in FIG. 24 may be performed when the setting value for an "index updating during projection" setting is designated as "valid" in the setting value screen 50, for example. The "index updating during projection" setting may indicate whether an index information updating process to be performed upon obtaining a new content file from the web server 10 is valid or invalid, for example.

In one modified embodiment, the process steps of FIG. 24 may be performed between steps S33 and S34 or between steps S36 and S22 of FIG. 23. By implementing the index information updating process of FIG. 24 in the automatic slideshow display process of FIG. 23 according to the second embodiment, the index information updating function may be realized in addition to the automatic slideshow function.

In the present embodiment, an updated index file may be obtained before obtaining a new content file to be displayed so that the index information retained by the UI screen generating unit 113 may be updated. In another embodiment, an updated index file may be obtained at predetermined time intervals rather than at the time of obtaining a new content file.

The index information updating process may be performed at predetermined time intervals in a case where content files are not deleted or added on a frequent basis so that overhead may be reduced, for example. In one embodiment, the index file reacquisition timing may be adjusted from the setting value screen 50 by enabling a setting value to be designated for an "index information updating interval" setting, for example.

According to an aspect of the present embodiment, when a content file is added or deleted or some other change is implemented at the web server 10, the change may be reflected in the index information retained by the UI screen generating unit 113. For example, in the context of a digital signage application, content files to be delivered may be dynamically changed to realize effective and responsive digital signage display.

Fourth Embodiment

A fourth embodiment of the present invention relates to starting an automatic slideshow function when the power is turned on. It is noted that features of the present embodiment that may be identical to those of the first through third embodiment are given the same reference numerals and their descriptions are omitted.

Figure 25:
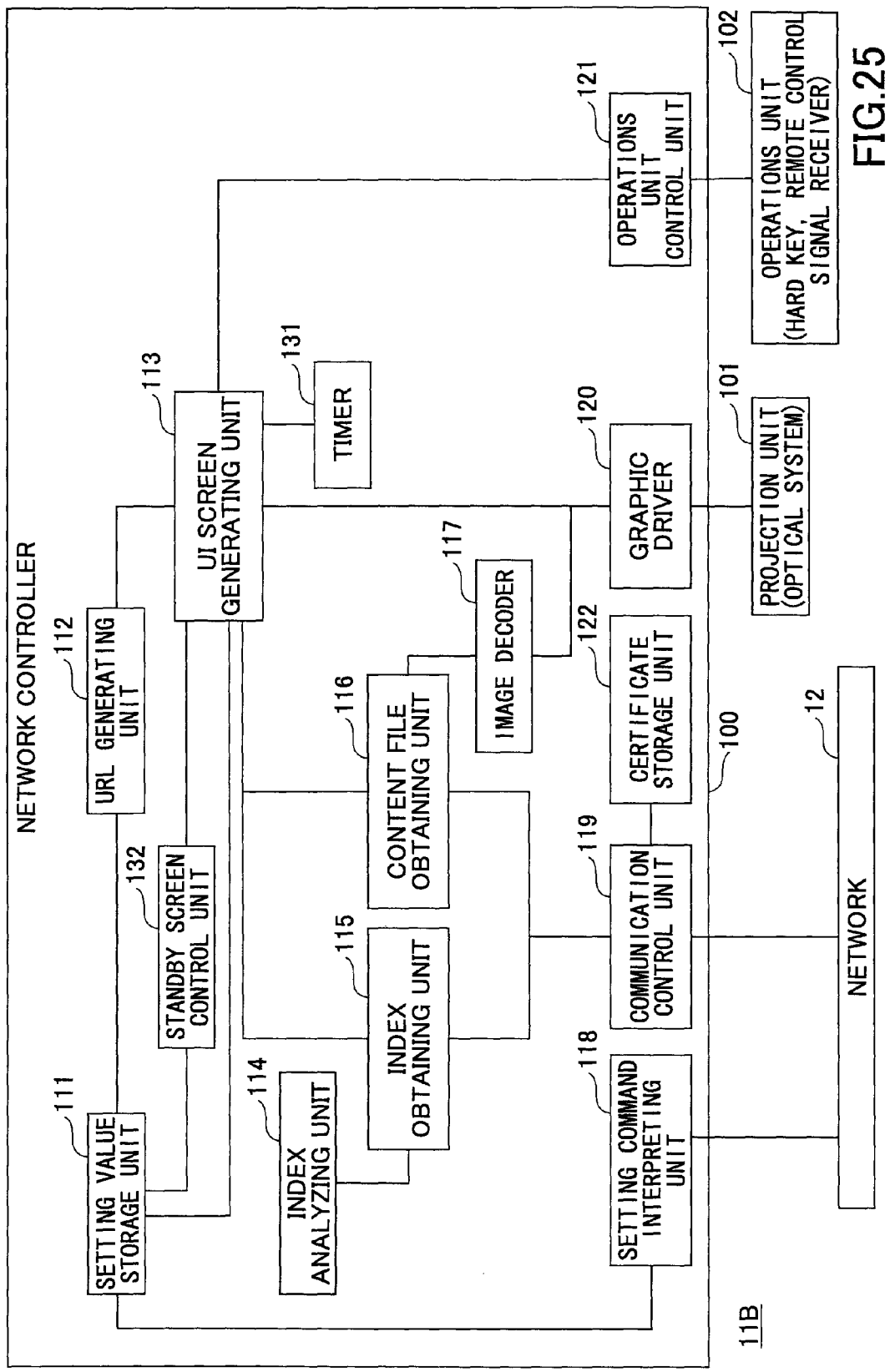
FIG. 25 is a block diagram showing an exemplary configuration of a projector according to a fourth embodiment of the present invention.

FIG. 25 is a block diagram showing an exemplary configuration of a projector 11B according to the fourth embodiment. The projector 11B of FIG. 25 includes a standby screen control unit 132 in addition to the components of the projector 11A shown in FIG. 22. According to the present embodiment, a setting value for an "automated demo" setting may be designated as valid or invalid in the setting value screen 50, for example. When the "automated demo" setting is designated as valid, the standby screen control unit 132 may prompt the UI screen generating unit 113 to start the automatic slideshow function when the power is turned on.

The "automated demo" setting may indicate whether an automatic slideshow starting process to be performed when the power is turned on is valid or invalid, an access number, and a directory, for example. It is noted that the directory included in the "automated demo" setting may be used as the "CURRENT HIERARCHY" (see FIGS. 17A-18B) when generating a URL.

Figure 26:
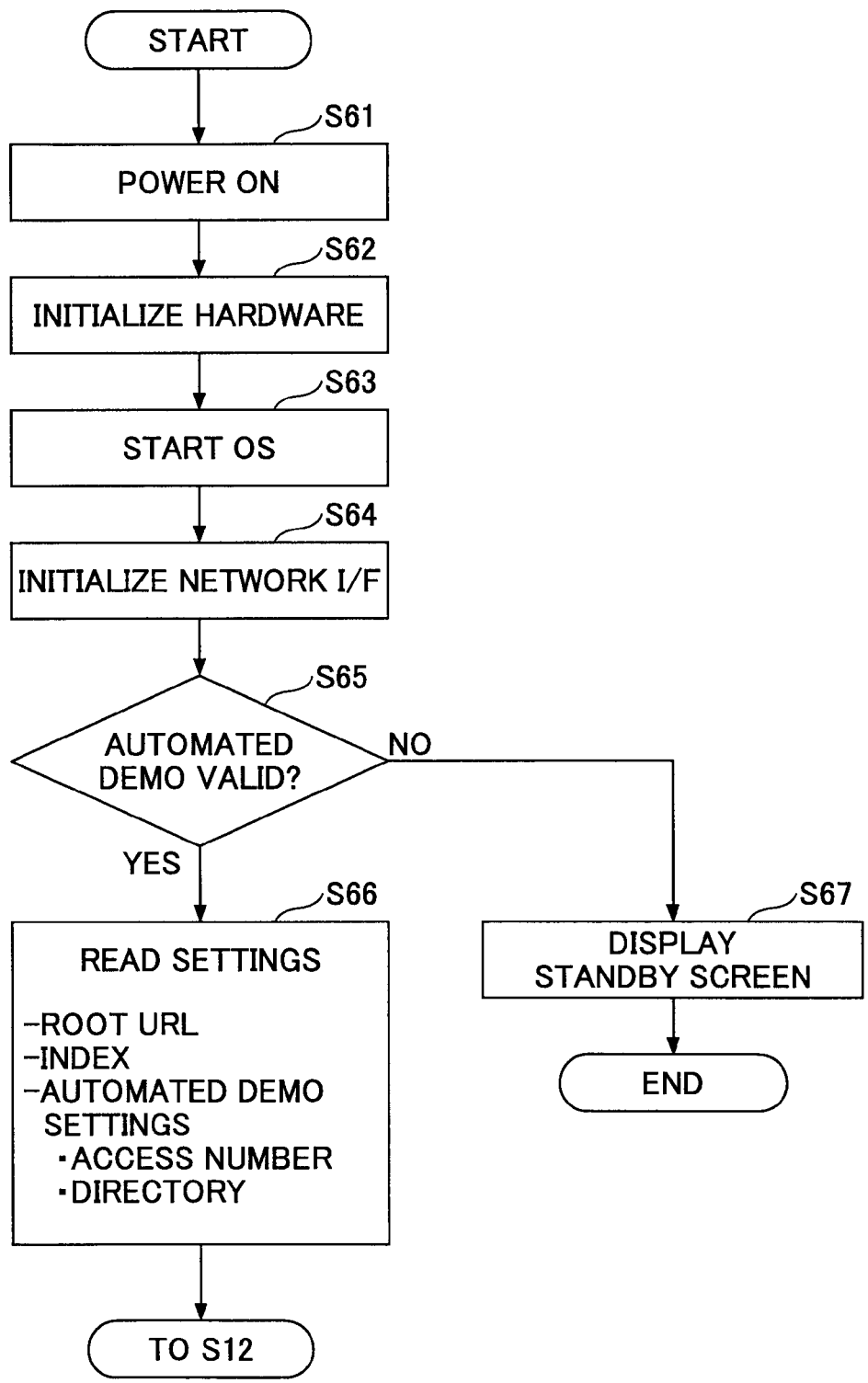
FIG. 26 is a flowchart showing exemplary process steps of the projector according to the fourth embodiment.

FIG. 26 is a flowchart showing exemplary process steps of the projector 11B according to the fourth embodiment. It is noted that process steps performed after step S66 of FIG. 26 may be identical to steps S12-S29 of FIG. 16 so that their descriptions are omitted.

In step S61, the power of the projector 11B is turned on. In steps S62-S64, the projector 11B initializes hardware, starts an OS (operating system), and initializes a network interface (I/F). In step S65, the standby screen control unit 132 determines whether the "automated demo" setting is valid. If the "automated demo" setting is valid, the standby screen control unit 132 proceeds to step S66 and prompts the UI screen generating unit 113 to start an automatic slideshow.

In step S66, the standby screen control unit 132 reads setting values for the root URL, index file, the automated demo, the access number, and the directory that are stored in the setting value storage unit 111, and uses the read setting values to prompt the UI screen generating unit 113 to perform the process steps of FIG. 16 from step S12. In this way, the standby screen control unit 132 prompts the UI screen generating unit 113 to start an automatic slideshow.

Figure 27:
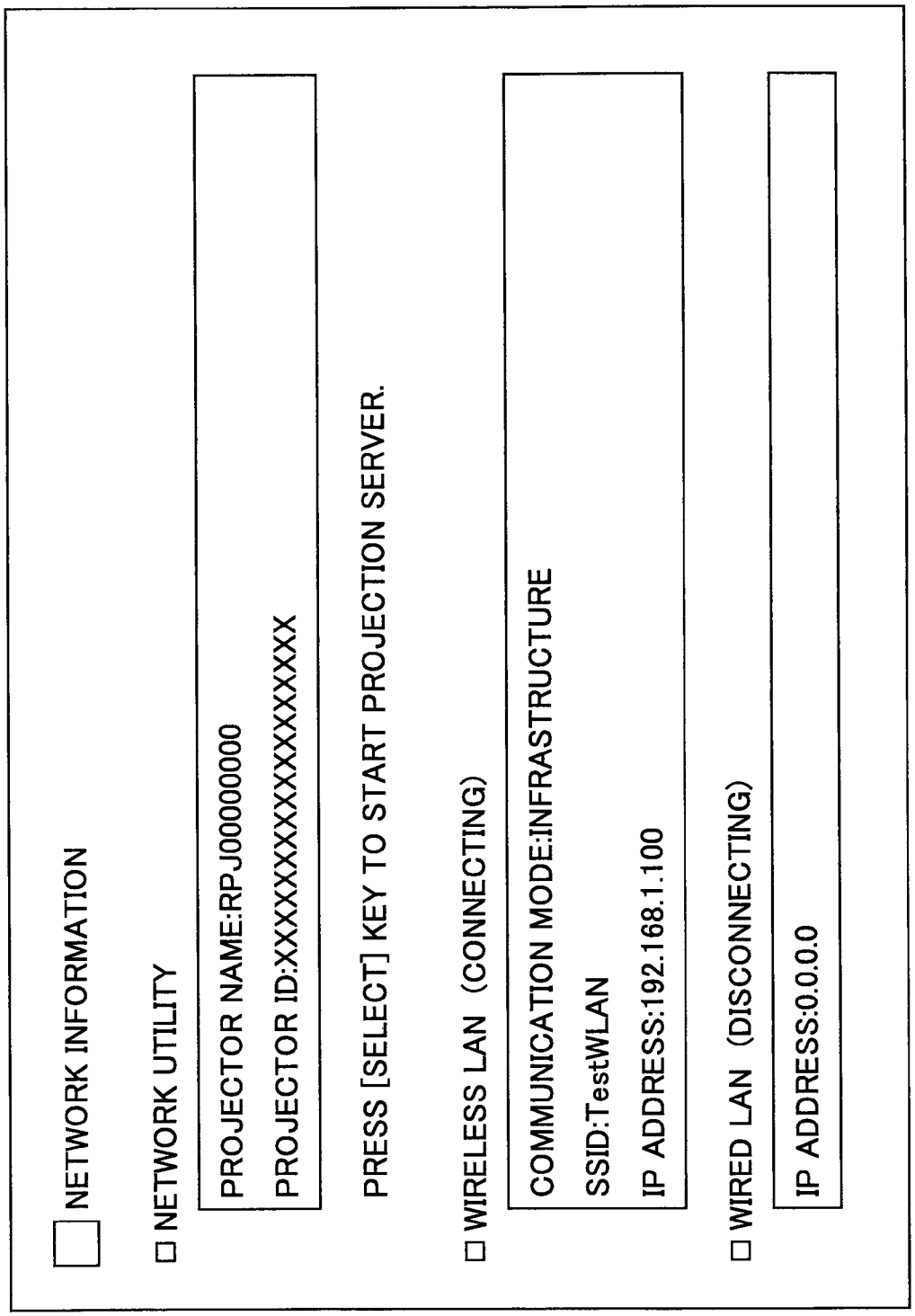
FIG. 27 shows an example of a standby screen.

It is noted that in step S65, if the "automated demo" setting is invalid, the standby screen control unit 132 may display a standby screen as is shown in FIG. 27, for example, and end the process of FIG. 26.

FIG. 27 shows an exemplary standby screen that may be displayed by the standby screen control unit 132. While such a standby screen is displayed, the operator of the projector 11B may operate the remote control 21 and press a [select] button to start the process of FIG. 16, for example.

In a digital signage application, for example, content projection is preferably started right after the power is turned on without requiring complicated key operations at the projection site. Accordingly, in the present embodiment, setting information for establishing connection with the projection server and information indicating the validity of the automatic slideshow starting process to be performed right after the power is turned on are stored as setting values in the setting value storage unit 111, and the standby screen control unit 132 is arranged to read the setting values when the power is turned on and prompt the UI screen generating unit 113 to start the automatic slideshow.

According to an aspect of the present embodiment, index files and content files may be automatically obtained from the web server 10 based on setting values stored in the setting value storage unit 111 to start an automatic slideshow. In this way, digital signage may be realized without requiring complicated key operations, for example.

Fifth Embodiment

A fifth embodiment of the present invention relates to limiting the user authorized to designate the setting values of the projection server settings via the setting screen 50 to a system administrator, for example. It is noted that features of the fifth embodiment that may be identical to those of the first through fourth embodiments are given the same reference numerals and their descriptions are omitted.

Figure 28:
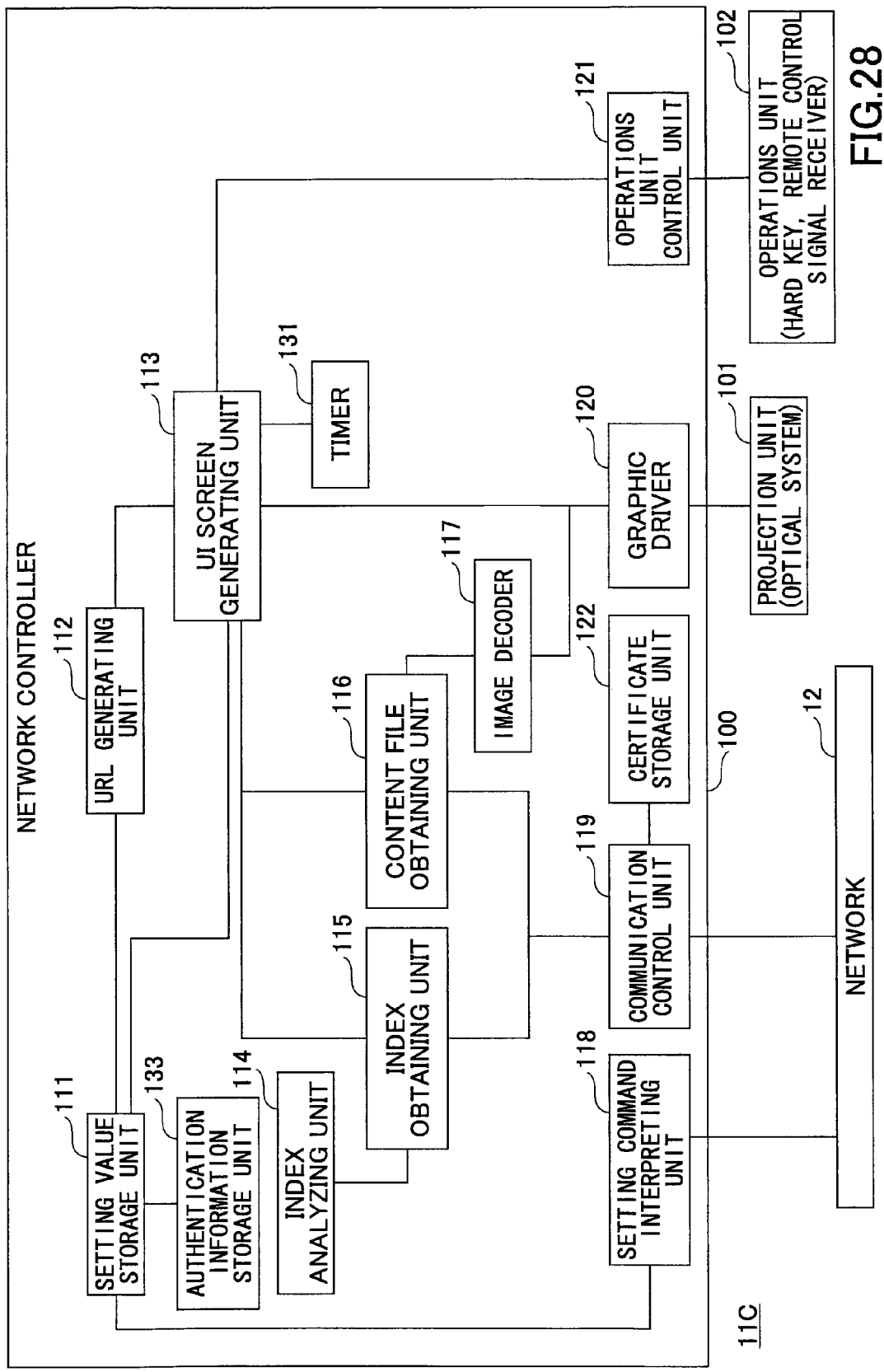
FIG. 28 is a block diagram showing an exemplary configuration of a projector according to a fifth embodiment of the present invention.

FIG. 28 is a block diagram showing an exemplary configuration of a projector 11C according to the fifth embodiment. The projector 11C of FIG. 28 includes an authentication information storage unit 133 in addition to the components of the projector 11 shown in FIG. 15. The authentication information storage unit 133 stores authentication information such as an ID and password of an administrator authorized to designate the setting values for the projection server settings via the setting screen 50 shown in FIG. 5, for example.

Figure 29:
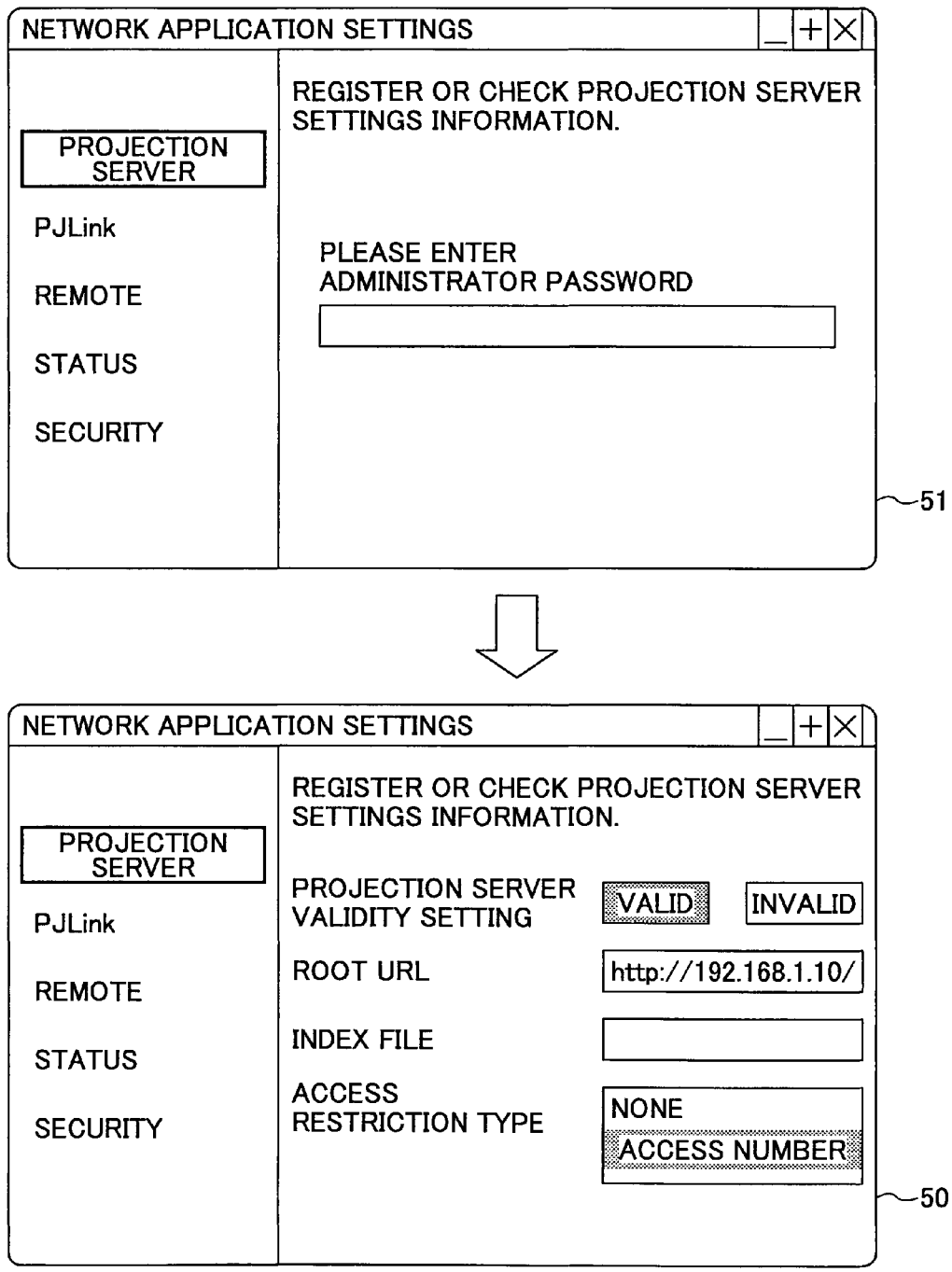
FIG. 29 shows examples of an authentication screen and the setting screen.

In a case where the setting value for a "setting change restriction" setting is designated as valid in the setting screen 50, for example, the UI screen generating unit 113 may display an authentication screen 51 such as that shown in FIG. 29 when a display request to display the setting screen 50 is received. The "setting change restriction" setting may indicate whether the process for restricting the user authorized to designate the setting values for the projection server settings via the setting screen 50 is valid or invalid, for example.

FIG. 29 shows examples of the authentication screen and the setting screen. A system administrator may enter authentication information such as an ID and a password in the authentication screen 51. The UI screen generating unit 113 may display the setting screen 50 if the authentication information entered in the authentication screen 51 corresponds to the authentication information stored in the authentication information storage unit 133, and may accept setting values for the projection server settings designated by the administrator via the setting screen 50.

In the case of designating setting values for the projection server settings from an external tool using a web API, an authentication mechanism such as basic authentication or digest authentication may be used to authenticate a user based on authentication information such as an ID and a password. FIG. 30 shows an exemplary web API having authentication information for basic authentication added to the web API shown in FIG. 20. A web API such as that shown in FIG. 30 may be used to designate setting values for the projection server settings from an external tool in the case where authentication is required.

According to an aspect of the present embodiment, an operator may not be able to display the setting screen 50 shown in FIG. 5 unless the operator enters the correct authentication information such as an ID and a password of a system administrator. In this way, an unauthorized user may be prevented from (erroneously) changing the projection server settings. In the present embodiment, the setting value for the "setting change restriction" setting that may be designated via the setting screen 50, for example, may not be changed from "valid" to "invalid" unless the correct authentication information such as the ID and the password of the system administrator is entered. In this way, an unauthorized user who is not the system administrator may be prevented from (erroneously) changing the settings so that stable operations of the projection system 1 may be ensured, for example.

According to another aspect of the present embodiment, the setting change restriction according to the present embodiment may be implemented in conjunction with remote management of the settings from an external tool using a web API. In this way, stable central management of plural projectors 11C may be enabled so that the management load may be reduced in a digital signage application, for example.

Sixth Embodiment

A sixth embodiment of the present invention relates to registering plural web servers 10 in a projection system.

It is noted that in the first through fifth embodiments, one web server 10 is registered in the projection system 1. In these embodiments, when a user wishes to obtain and project content files from plural web servers 10, the user must change the registered settings to switch from one web server 10 to another web server 10. Further, when the user neglects to reset the settings back to the original settings, connection may not be established with the original web server 10. This may cause an inconvenience when the projector 11 is used by plural users, for example. Accordingly, the sixth embodiment of the present invention enables registration of plural web servers 10 in the projection system. It is noted that features of the sixth embodiment that may be identical to those of the first through fifth embodiments are given the same reference numerals and their descriptions are omitted.

Figure 31:
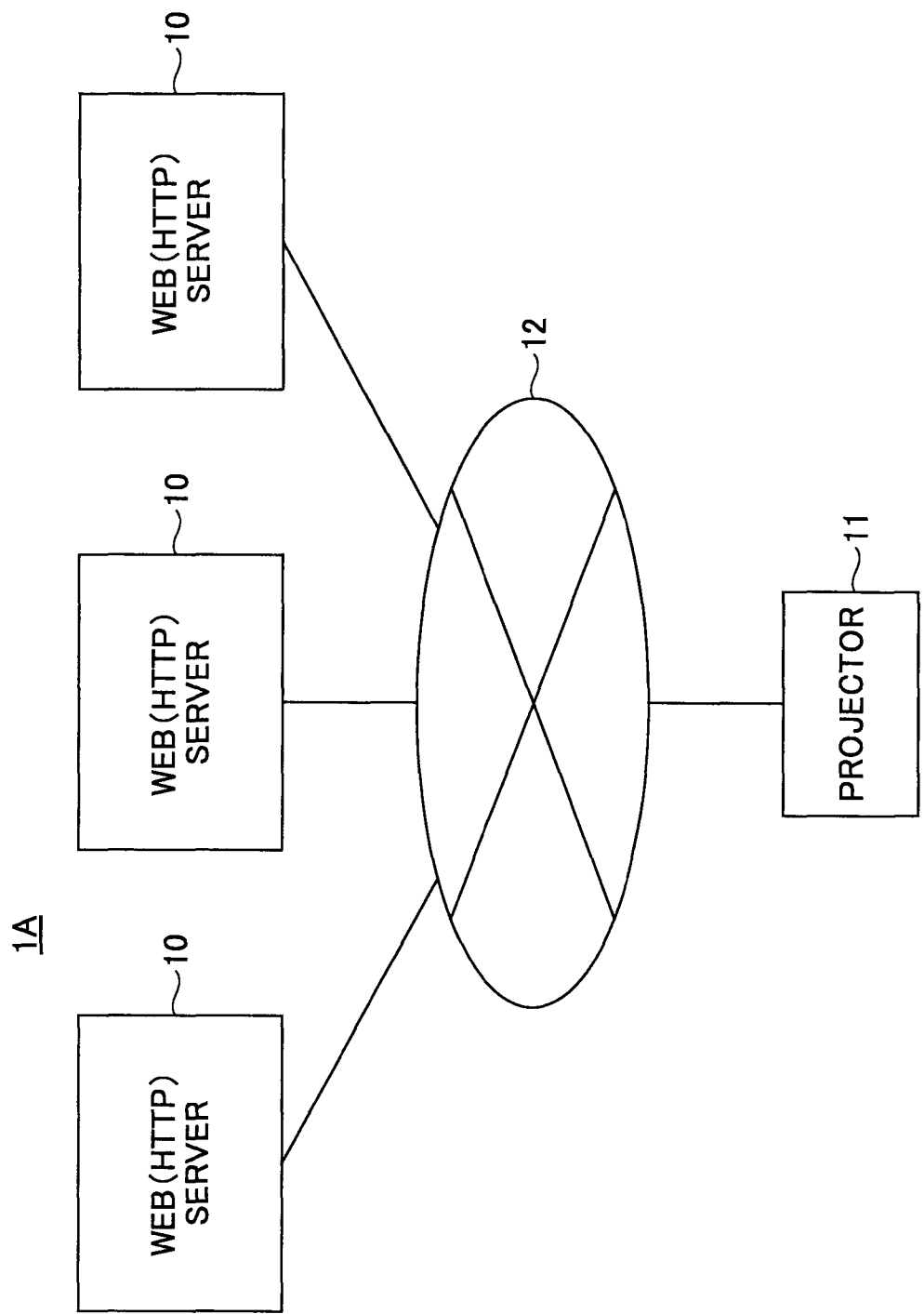
FIG. 31 shows an exemplary configuration of a projection system according to a sixth embodiment of the present invention.

FIG. 31 shows an exemplary configuration of a projection system 1A according to the sixth embodiment. The projection system 1A includes plural web servers 10 and the projector 11 that are connected to each other via the network 12.

Upon obtaining an index file from the web server 10, the projector 11 uses the root URL and the index file name designated in the setting screen 50 shown in FIG. 5. Accordingly, in the case where plural web servers 10 are registered, server setting information such as that shown in FIG. 32 is stored for each of the web servers 10.

FIG. 32 shows an exemplary configuration of the server setting information of the web server 10. The projector 11 may be arranged to store plural sets of such server setting information (e.g., 10 sets maximum). The server setting information shown in FIG. 32 includes the root URL, the index file name, the title, and the directory (current directory) as setting items for which corresponding setting values may be designated.

Figure 33:
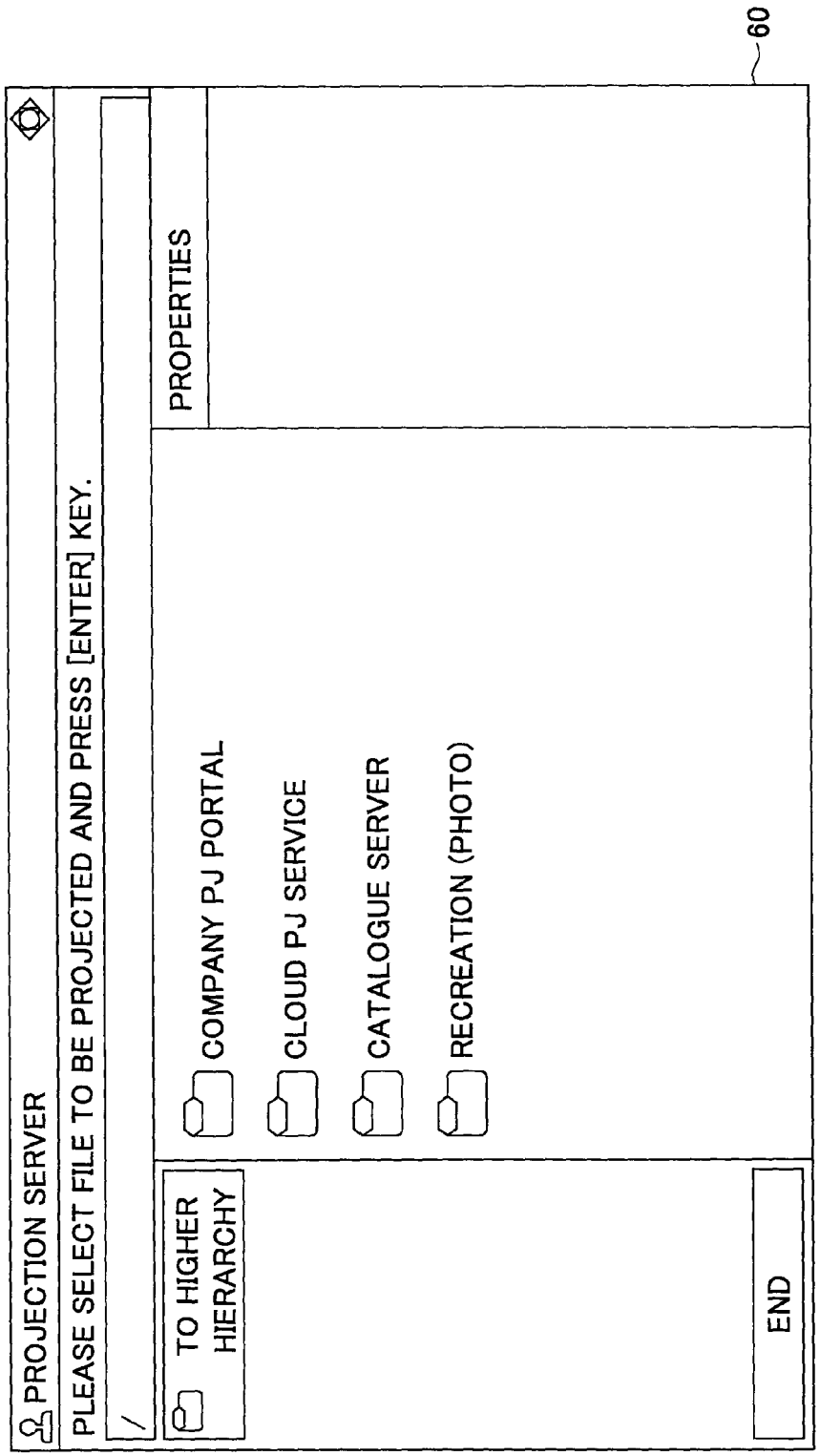
FIG. 33 shows an example of a server list screen.

In one embodiment, when an access number input is accepted, the projector 11 uses the title included in the server setting information of FIG. 32 to project a server list screen 60. FIG. 33 shows an example of the server list screen 60 that is displayed in the present embodiment.

When one of the titles of the web server 10 is selected from the server list screen 60, the projector 11 obtains the server setting information of the web server 10 identified by the selected title. The projector 11 then proceeds to perform the process steps of FIG. 16 from step S12. It is noted that in the present embodiment, the setting value for "DIRECTORY" included in the sever setting information of FIG. 32 is used as the "CURRENT DIRECTORY" to generate the root URL in step S12.

In another embodiment, since there may be cases where the web servers 10 do not use a common access number, the access number input may be requested after the web server 10 is selected from the server list screen 60 shown in FIG. 33. In a further embodiment, whether to accept the access number input before or after the web server 10 is selected may be designated via the setting screen 50, for example.

After the web server 10 is selected (and the access number input is accepted), the projector 11 may display a file list screen 30 such as that shown in FIG. 3. In the present embodiment, the file list screen 30 may include a button for returning to the server list screen 60 (e.g., [TO SERVER LIST] button).

According to an aspect of the present embodiment, plural web servers 10 may be registered and the registered web servers 10 may be indicated in the server list screen 60. In this way, a user may select a web server 10 via the same user interface as that used for selecting a directory or a content file so that the web server 10 to be accessed may be easily switched through simple operations.

Seventh Embodiment

A seventh embodiment of the present invention relates returning to the standby screen when user operations are not detected for a predetermined time period.

When a user moves away from the projector 11 while the file list screen 30 or the file projection screen 40 is displayed, confidential information stored in the web server 10 may possibly be leaked to outsiders. Accordingly, in the seventh embodiment of the present invention, the standby screen is displayed when user operations are not detected for a predetermined time period. It is noted that features of the seventh embodiment that may be identical to those of the first through sixth embodiments are given the same reference numerals and their descriptions are omitted.

The present embodiment may be implemented when the setting value for an "auto reset" setting that may be adjusted at the setting screen 50 is designated as "valid," for example. In step S18 or step S27 of FIG. 16, when a user operation input is not accepted over a predetermined time period, the standby screen control unit 132 of the projector 11B shown in FIG. 25 stops the projection server function and displays the standby screen shown in FIG. 27. The "auto reset" setting may indicate whether the process of returning to the standby screen is valid or invalid, and the predetermined time period that is to elapse before returning to the standby screen (e.g., minutes), for example.

In one embodiment, the projector 11B may disconnect any connections that are established upon returning to the standby screen. In another embodiment, the projector 11B may be arranged to refrain from returning to the standby screen even if the "auto reset" setting is designated as "valid" when an automatic slideshow is in progress.

According to an aspect of the present embodiment, when a user moves away from the projector 11B for a relatively long period of time, the projector 11B may automatically return to the standby screen after a predetermined time period so that information leakage may be prevented, for example.

Eighth Embodiment

An eight embodiment of the present invention relates to connecting an IC card reader to the projector 11 and realizing access restriction based on IC card authentication information.

When the access number for gaining access to the projection server function is a relatively long number string, operations for inputting the access number using the remote control 21 may be cumbersome for the user and the user may be prone to make mistakes. Also, when the access number is a long number string, the user may have to write down the access number on a piece of paper, for example, which could lead to access number leakage. Accordingly, in the eighth embodiment, an IC card reader is connected to the projector 11 and access restriction based on IC card authentication information is implemented. It is noted that features of the present embodiment that may be identical to those of the first through seventh embodiments are given the same reference numbers and their descriptions are omitted.

Figure 34:
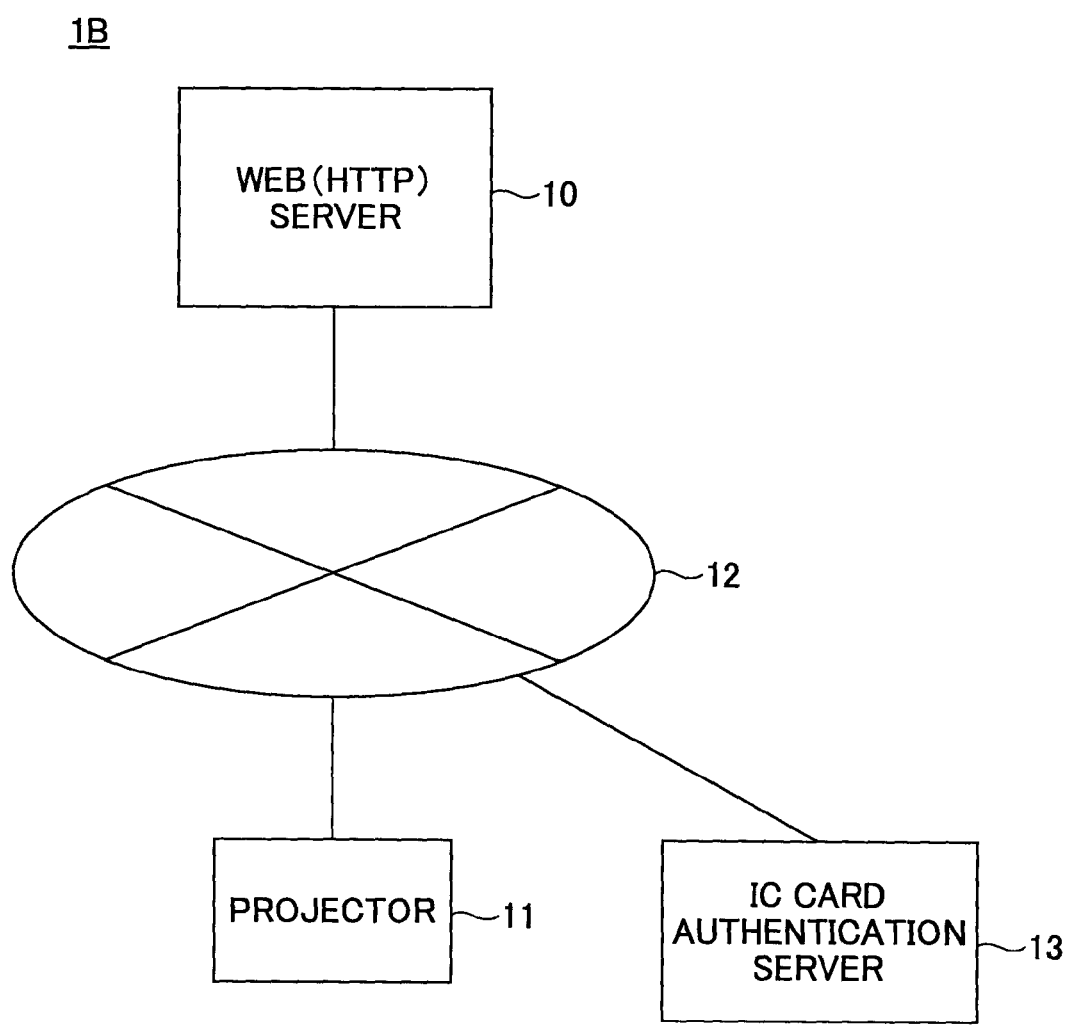
FIG. 34 shows an exemplary configuration of a projection system according to an eighth embodiment of the present invention.

FIG. 34 shows an exemplary configuration of a projection system 1B according to the eighth embodiment. The projection system 1B of FIG. 34 includes an IC card authentication server 13 in addition to the components of the projection system 1 shown in FIG. 1. The IC card authentication server 13 may be an internal authentication server such as an LDAP (Lightweight Directory Access Protocol) server.

Figure 35:
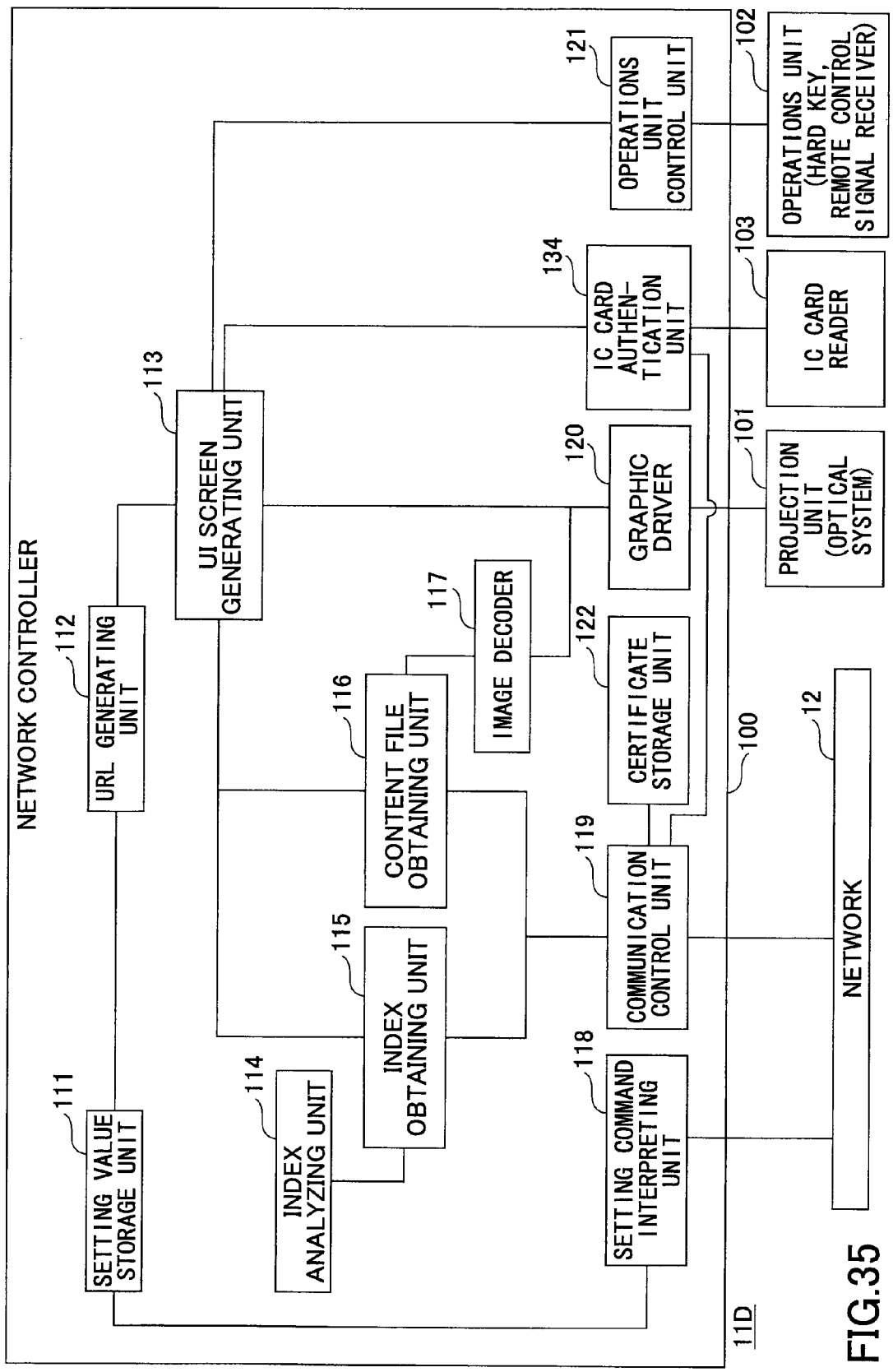
FIG. 35 shows an exemplary configuration of a projector according to the eighth embodiment.

FIG. 35 shows an exemplary configuration of a projector 11D according to the eighth embodiment. The projector 11D shown in FIG. 35 includes an IC card authentication unit 134 in addition to the components of the projector 11 shown in FIG. 15. Also, the projector 11D is connected to an IC card reader 103.

The IC card authentication unit 134 obtains an IC card number from the IC card reader 103 and uses the obtained IC card number to perform IC card authentication. The IC card authentication unit 134 may perform IC card authentication based on an authentication server cooperation setting and authentication server information (e.g., host, user ID, and password) that may be designated via the setting screen 50 shown in FIG. 5, for example.

If authentication server cooperation is not designated, the IC card authentication unit 134 may use the IC card number obtained from the IC card reader 103 as the access number. If authentication server cooperation is designated, the IC card authentication unit 134 may obtain an access number corresponding to the obtained IC card number from the IC card authentication server 13.

Figure 36:
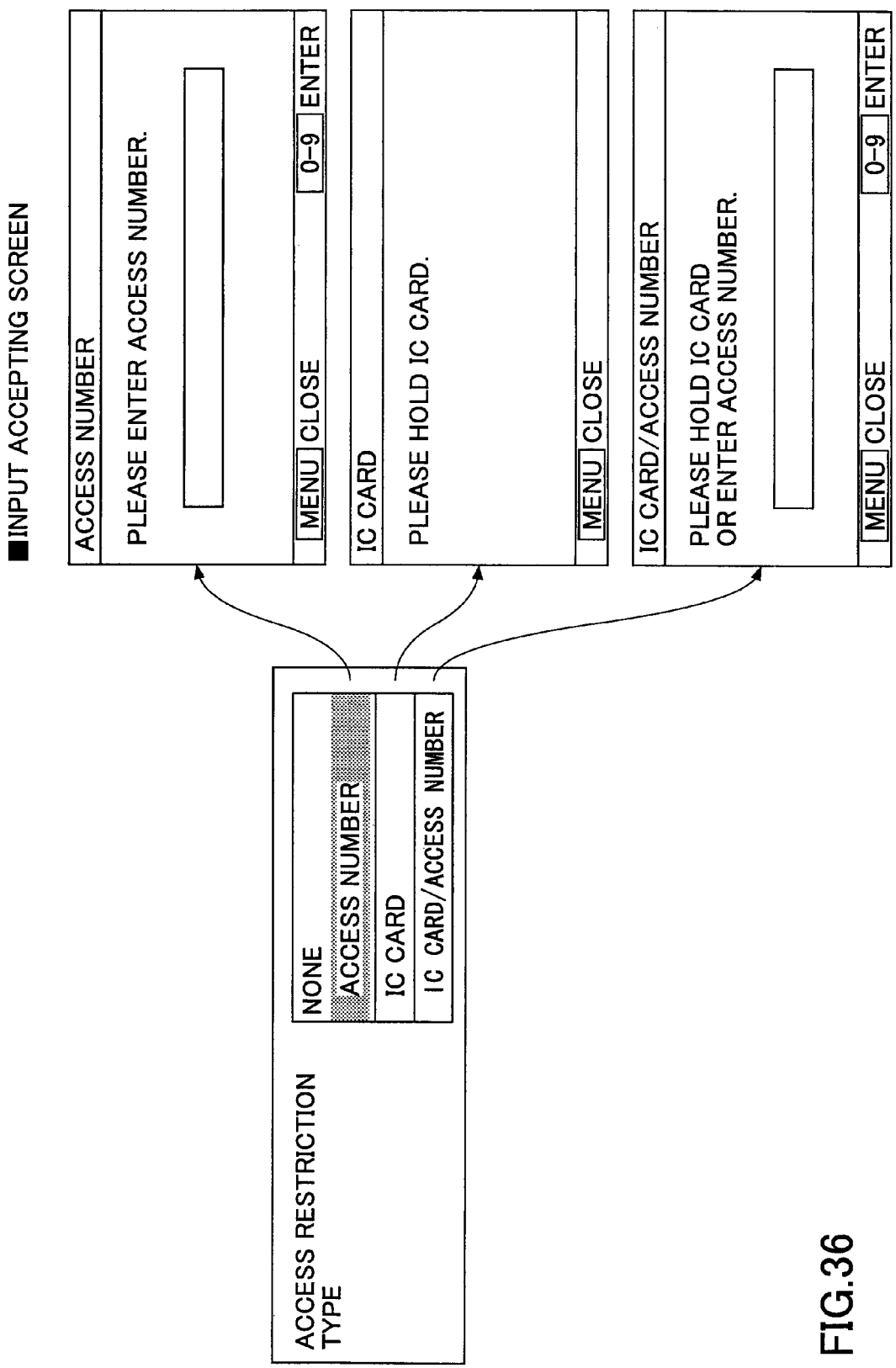
FIG. 36 shows examples of an access restriction type setting field and input accepting screens.

It is noted that in the present embodiment, the setting screen 50 shown in FIG. 5 may indicate an access restriction type setting field as is shown in FIG. 36 to enable designation of whether to implement access restriction based on an access number, access restriction based on an IC card, or access restriction based on an access number/IC card.

FIG. 36 shows examples of the access restriction type setting field and input accepting screens. It is noted that in the case where access restriction based on an access number/IC card is implemented, one access restriction type may be given priority over the other depending on the timing of the detection of a "select" key input from the remote control 21 and the timing of the IC card recognition by the IC card reader 103.

Figure 37:
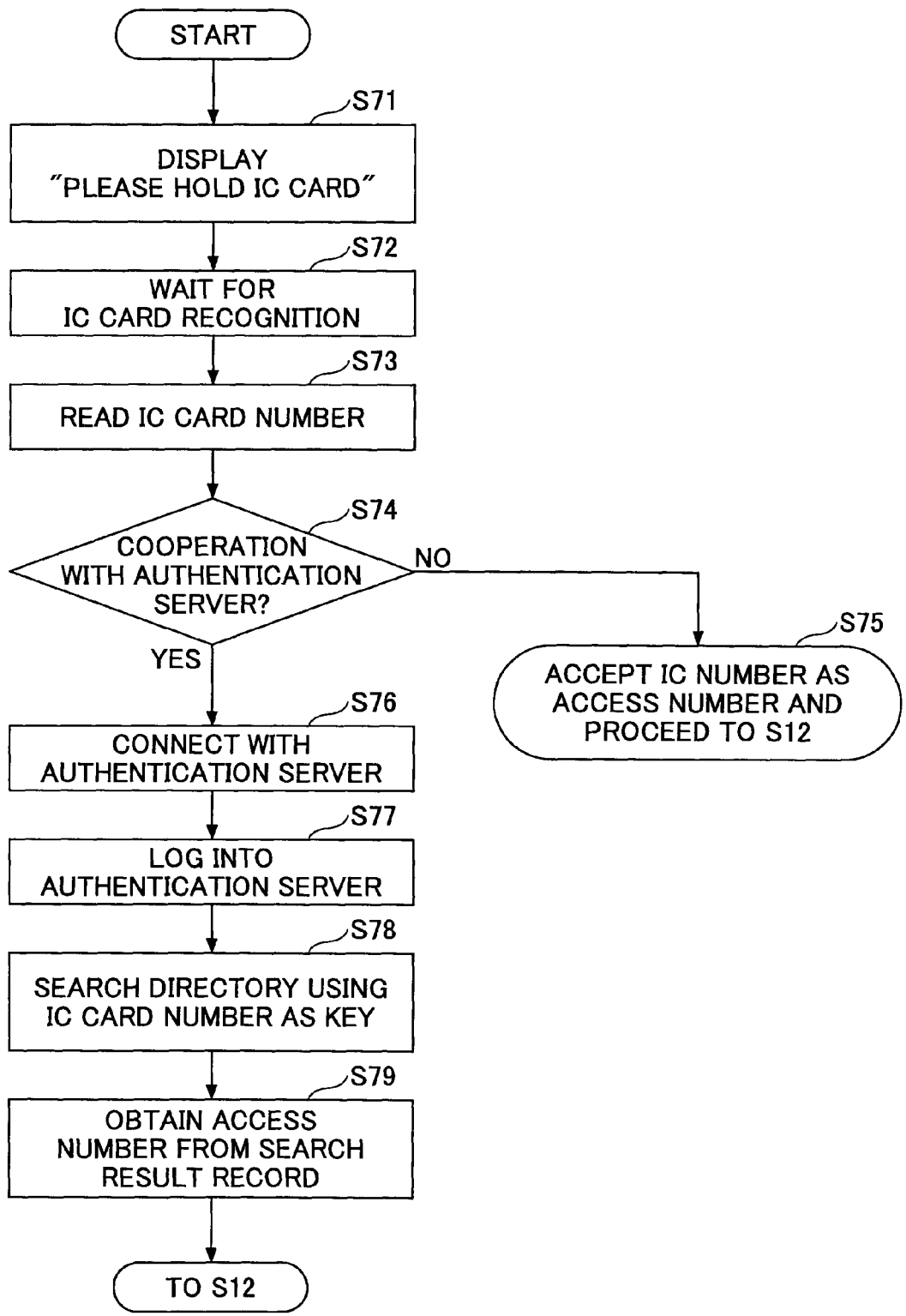
FIG. 37 is a flowchart showing exemplary process steps of the projector according to the eighth embodiment.

FIG. 37 is a flowchart showing exemplary process steps performed by the projector 11D according to the eighth embodiment. It is noted process steps performed after step S75 or step S79 of FIG. 37 may be identical to the process steps from step S12 of FIG. 16 so that their descriptions are omitted. Also, it is noted that FIG. 37 illustrates process steps that are performed in a case where access restriction based on an IC card is designated as the access restriction type.

In step S71, the UI screen generating unit 113 displays the message "PLEASE HOLD IC CARD" in the input accepting screen. In step S72, the IC card reader 103 waits for a user to hold an IC card so that it may recognize the IC card. In step S73, upon recognizing the IC card, the IC card reader 103 reads an IC card number from the IC card and provides the read IC card number to the IC card authentication unit 134.

Upon obtaining the IC card number from the IC card reader 103, the IC card authentication unit 134 proceeds to step S74 to determine whether cooperation with the authentication server is designated. If cooperation with the authentication server is not designated (S74, NO), the IC card authentication unit 134 accepts the IC card number as the access number and proceeds to step S12 of FIG. 16. It is noted that in a case where cooperation with the authentication server is not designated, the IC card authentication server 13 may be omitted.

On the other hand, if cooperation with the authentication server 13 is designated (S74, YES), the IC card authentication unit 134 proceeds to step S76 to establish connection with the IC card authentication server 13. In step S77, the IC card authentication unit 134 logs into the IC card authentication server 13.

In step S78, the IC card authentication unit 134 notifies the IC card authentication server 13 of the IC card number. The IC card authentication server 13 searches its directory using the IC card number as a key. In step S79, the IC card authentication server 13 obtains an access number from the search result and notifies the IC card authentication unit 134 of the obtained access number. The IC card authentication unit 134 accepts the access number obtained from the IC card authentication server 13 and proceeds to step S12 of FIG. 16.

According to an aspect of the present embodiment, a user may gain access to the web server 10 by simply holding an IC card over the IC card reader 103 rather that having to input an access number via the remote control 21 so that convenience of the projection system 1B may be improved. Also, security may be reinforced by having the projector 11D cooperate with the IC card authentication server 13.

It is noted that the web server 10 corresponds to an exemplary embodiment of a server apparatus of the present invention. The projectors 11, 11A, 11B, 11C, and 11D correspond to exemplary embodiments of an image display apparatus of the present invention. The projection unit 101 corresponds to an exemplary embodiment of a display unit of the present invention. The URL generating unit 112 corresponds to an exemplary embodiment of a location information generating unit of the present invention. The index obtaining unit 115 corresponds to an exemplary embodiment of an index obtaining unit of the present invention. The UI screen generating unit 113 corresponds to an exemplary embodiment of a list screen generating unit and a display screen generating unit of the present invention. The content file obtaining unit 116 corresponds to an exemplary embodiment of an image data obtaining unit of the present invention. The setting command interpreting unit 118 corresponds to an exemplary embodiment of a setting command accepting unit of the present invention. The setting screen 50 corresponds to an exemplary embodiment of a setting accepting unit of the present invention. The IC card reader 103 corresponds to an exemplary embodiment of a recording medium reading unit, the IC card authentication server corresponds to an exemplary embodiment of an authentication apparatus, and the IC card authentication unit 134 corresponds to an exemplary embodiment of an authentication unit of the present invention. The URL corresponds to exemplary location information.

Further, the present invention is not limited to these embodiments, and numerous variations and modifications may be made without departing from the scope of the present invention.

The present application is based on and claims the benefit of the priority dates of Japanese Patent Application Nos. 2011-242718 and 2012-226000 filed on Nov. 4, 2011 and Oct. 11, 2012, respectively, the entire contents of which are hereby incorporated by reference.

The invention claimed is:

1. A projector that is connected to a server apparatus via a network, the projector comprising:
   a location information generating unit that generates at least one of location information of index information stored in the server apparatus and location information of image data stored in the server apparatus;
   an index obtaining unit that obtains the index information from the server apparatus using the location information of the index information;
   a list screen generating unit that generates a list screen including information on the image data stored in the server apparatus using the index information and causes a projection unit to project the list screen;
   an image data obtaining unit that obtains the image data from the server apparatus using the location information of the image data that is selected by an operator from the list screen;
   a display screen generating unit that generates a display screen of the obtained image data and causes the projection unit to project the display screen; and
   a setting command accepting unit that accepts a setting value designation from an external device via the network, the external device using a web application programming interface to designate a setting value for at least one of root location information of a root of the server apparatus and a name of the index information.

2. The projector as claimed in claim 1, further comprising:
a setting value storage unit that stores the root location information of the root of the server apparatus and the name of the index information; wherein
the location information generating unit obtains the root location information of the root of the server apparatus and the name of the index information from the setting value storage unit and generates the location information of the index information stored in the server apparatus using the root location information of the root of the server apparatus, current hierarchy information, and the name of the index information.

3. The projector as claimed in claim 2, wherein
the location information generating unit generates the location information of the image data stored in the server apparatus using the index information obtained from the server apparatus, the root location information of the root of the server apparatus obtained from the setting value storage unit, and the current hierarchy information.

4. The projector as claimed in claim 2, wherein
the setting value storage unit stores a designated access restriction type; and
the location information generating unit obtains the designated access restriction type from the setting value storage unit and embeds an access number in the location information of the index information stored in the server apparatus and the location information of the image data stored in the server apparatus if the designated access restriction type corresponds to an access number-based access restriction.

5. The projector as claimed in claim 4, further comprising:
an authentication unit that obtains from a recording medium reading unit information read from a recording medium by the recording medium reading unit; wherein
if the authentication information is not cooperating with an authentication apparatus, the authentication unit uses the information read from the recording medium by the recording medium reading unit as the access number; and
if the authentication information is cooperating with the authentication apparatus, the authentication unit obtains from the authentication apparatus the access number corresponding to the information read from the recording medium by the recording medium reading unit after the authentication apparatus successfully authenticates the information read from the recording medium by the recording medium reading unit.

6. The projector as claimed in claim 2, wherein
the index information includes at least one of information on image data included in a directory of the current hierarchy and information on a subdirectory.

7. The projector as claimed in claim 1, further comprising:
a certificate storage unit that stores a digital certificate that is used to perform authentication when the index obtaining unit and the image data obtaining unit establish communication with the server apparatus.

8. The projector as claimed in claim 7, wherein
the certificate storage unit stores a certificate authority certificate and a device certificate that are protected from being rewritten by the operator.

9. The projector as claimed in claim 1, wherein
the display screen generating unit sequentially generates the display screen of the image data that is sequentially obtained from the server apparatus by the image data obtaining unit at predetermined time intervals and causes the projection unit to project the generated display screen.

10. The projector as claimed in claim 9, wherein
the index obtaining unit obtains the index information from the server apparatus at a predetermined timing, which corresponds to at least one of predetermined time intervals and a time before the image data obtaining unit obtains the image data from the server apparatus.

11. The projector as claimed in claim 9, wherein
the display screen generating unit sequentially generates the display screen of the image data that is sequentially obtained from the server apparatus by the image data obtaining unit at predetermined time intervals after a power is turned on and automatically starts operations of the display unit to project the generated display screen.

12. The projector as claimed in claim 1, further comprising:
an authentication information storage unit that stores authentication information of an authorized operator that is authorized to designate a setting value for a setting related to the server apparatus;
a setting accepting unit that accepts the setting value for the setting related to the server apparatus that is designated by the authorized operator if the authentication information of the authorized operator is stored in the authentication information storage unit.

13. The projector as claimed in claim 1, wherein
when an operation by the operator is not accepted for a predetermined time period, the list screen generating unit and the display screen generating unit are configured to disconnect a connection with the server apparatus, generate a standby screen, and cause the projection unit to project the generated standby screen.

14. A projector system comprising:
a server apparatus that stores image data;
a projector that projects the image data stored in the server apparatus; and
a network that establishes connection between the server apparatus and the projector; wherein
the projector includes
a location information generating unit that generates at least one of location information of index information stored in the server apparatus and location information of image data stored in the server apparatus;
an index obtaining unit that obtains the index information from the server apparatus using the location information of the index information;
a list screen generating unit that generates a list screen including information on the image data stored in the server apparatus using the index information and causes a projection unit to project the list screen;
an image data obtaining unit that obtains the image data from the server apparatus using the location information of the image data that is selected by an operator from the list screen;
a display screen generating unit that generates a display screen of the obtained image data and causes the projection unit to project the display screen; and
a setting command accepting unit that accepts a setting value designation from an external device via the network, the external device using a web application programming interface to designate a setting value for at least one of root location information of a root of the server apparatus and a name of the index information.

* * * * *